(12) United States Patent
Yoshida et al.

(10) Patent No.: US 8,007,877 B2
(45) Date of Patent: Aug. 30, 2011

(54) LIQUID CRYSTAL OPTICAL MODULATION ELEMENT AND OPTICAL HEAD DEVICE

(75) Inventors: Kara Yoshida, Tokyo (JP); Yuriko Kaida, Tokyo (JP); Hiromichi Nagayama, Tokyo (JP); Hiroshi Kumai, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 12/910,032

(22) Filed: Oct. 22, 2010

(65) Prior Publication Data

US 2011/0037910 A1 Feb. 17, 2011

Related U.S. Application Data

(60) Division of application No. 12/713,971, filed on Feb. 26, 2010, now Pat. No. 7,846,515, which is a division of application No. 12/105,643, filed on Apr. 18, 2008, now Pat. No. 7,820,250, which is a continuation of application No. PCT/JP2006/320665, filed on Oct. 17, 2006.

(30) Foreign Application Priority Data

Oct. 18, 2005 (JP) ................................. 2005-302812

(51) Int. Cl.
*C09K 19/38* (2006.01)
*C09K 19/54* (2006.01)
*C09K 19/34* (2006.01)
*C09K 19/20* (2006.01)
*C09K 19/12* (2006.01)
*G02F 1/13* (2006.01)
*G11B 7/135* (2006.01)

(52) U.S. Cl. ...................... 428/1.1; 428/1.3; 252/299.01; 252/299.5; 252/299.63; 252/299.66; 252/299.67; 349/2; 349/61; 349/183; 349/193; 349/202; 369/112.01; 369/112.02; 369/112.03; 369/112.06

(58) Field of Classification Search ............. 252/299.01, 252/299.5, 299.63, 299.66, 299.67; 349/2, 349/61, 183, 193, 202; 369/112.01, 112.02, 369/112.03, 112.06; 428/1.1, 1.3
See application file for complete search history.

(56) References Cited

U.S. PATENT DOCUMENTS

| | | | |
|---|---|---|---|
| 5,644,416 A | 7/1997 | Morikawa et al. | |
| 5,670,083 A | 9/1997 | Akashi et al. | |
| 6,153,722 A | 11/2000 | Schoenfeld et al. | |
| 6,733,689 B1 | 5/2004 | Meyer et al. | |
| 7,371,438 B2 | 5/2008 | Kaida et al. | |
| 7,442,418 B2 | 10/2008 | Kaida et al. | |
| 7,514,514 B2 | 4/2009 | Buchecker et al. | |
| 7,714,977 B2 * | 5/2010 | Hotaka et al. ................. | 349/182 |
| 7,820,250 B2 * | 10/2010 | Yoshida et al. ................. | 428/1.1 |
| 7,846,515 B2 * | 12/2010 | Yoshida et al. ................. | 428/1.1 |
| 2004/0138394 A1 | 7/2004 | Buchecker et al. | |
| 2006/0124900 A1 | 6/2006 | Kumai et al. | |
| 2007/0102669 A1 | 5/2007 | Kaida et al. | |
| 2007/0104894 A1 | 5/2007 | Kaida et al. | |
| 2007/0104895 A1 | 5/2007 | Hotaka et al. | |
| 2008/0204650 A1 | 8/2008 | Nagayama et al. | |

FOREIGN PATENT DOCUMENTS

| | | |
|---|---|---|
| CN | 1408749 | 4/2003 |
| CN | 1501948 | 6/2004 |
| JP | 62-112131 | 5/1987 |
| JP | 6-095083 | 4/1994 |
| JP | 7-036008 | 2/1995 |
| JP | 9-230300 | 9/1997 |
| JP | 9-291282 | 11/1997 |
| JP | 10-195138 | 7/1998 |
| JP | 2003-90990 | 3/2003 |
| JP | 2004-263037 | 9/2004 |
| JP | 2004-530734 | 10/2004 |
| JP | 2005-502730 | 1/2005 |
| JP | 2005-301138 | 10/2005 |
| WO | 02/053609 | 7/2002 |
| WO | 2006/001096 | 1/2006 |
| WO | WO 2007/046294 | 4/2007 |

* cited by examiner

*Primary Examiner* — Shean C Wu
(74) *Attorney, Agent, or Firm* — Oblon, Spivak, McClelland, Maier & Neustadt, L.L.P.

(57) ABSTRACT

To provide a liquid crystal optical modulation element which is excellent in durability against blue laser and which can maintain the characteristics for a long period of time.
A liquid crystal optical modulation element to modulate a laser beam having a wavelength of at most 500 nm, which comprises a layer of a polymer liquid crystal composition sandwiched between a pair of transparent substrates facing each other, characterized in that
  each of the pair of transparent substrates has an alignment film on the surface which faces the other transparent substrate, and
  the polymer liquid crystal composition is a polymer liquid crystal containing a hindered amine compound and a hindered phenol compound.

22 Claims, No Drawings

LIQUID CRYSTAL OPTICAL MODULATION ELEMENT AND OPTICAL HEAD DEVICE

This is a division of application Ser. No. 12/713,971 filed on Feb. 26, 2010, now U.S. Pat. No. 7,846,515, which is a division of application Ser. No. 12/105,643 filed on Apr. 18, 2008, now U.S. Pat. No. 7,820,250, which is a continuation of application No. PCT/JP06/320665 filed on Oct. 17, 2006.

TECHNICAL FIELD

The present invention relates to a liquid crystal optical modulation element to be used for modulating a laser beam having a wavelength of at most 500 nm, and an optical head device.

BACKGROUND ART

An optical element (such as a phase plate or a deflection element such as a diffraction grating) employing liquid crystal is small in size and has high durability since it has no mechanical moving portion, and thus has attracted attention as an optical modulation element, and as mounted on an optical head device, it is performing a role to modulate (e.g. deflect or diffract) a laser beam at the time of writing information on an optical disk or reading information from an optical disk.

For example, at the time of reading information, linearly-polarized light emitted from a laser light source is transmitted through a deflecting element and then through a ¼ phase plate and arrives at the surface of an optical disk. The polarization direction of the outward linearly-polarized light is aligned in a direction not changed by the deflecting element, and the outward linearly-polarized light is linearly transmitted through the deflecting element and transformed by the ¼ phase plate into a circularly-polarized light. This circularly-polarized light is reflected on the recording surface and becomes a reversed circularly-polarized light, which is again transformed by the ¼ phase plate into a linearly-polarized light perpendicular to incident light. Such a returning light beam will have its traveling direction bent when it is again passed through the deflecting element, and arrives at a light receiving element.

Further, during reading or writing of information, if the optical disk undergoes plane wobbling or the like, the focus position of the beam spot will be displaced from the recording surface, and a servo mechanism will be required to detect and correct the displacement to let the beam spot follow a concavo-convex pit on the recording surface. Such a servo system for an optical disk is constructed so that the focus of a beam spot irradiated from a laser light source is adjusted on the recording surface, and then the track position is detected to let the beam spot follow the desired track. Further, it is also necessary to make sure that the laser beam reflected without hitting the pit on the recording surface will not return as it is to the light source. Such optical elements are not limited to optical pickup elements used for reading records on optical disks, but they are utilized also for imaging elements in application to projectors, etc. or communication devices in application to wavelength-tunable filters, etc.

In recent years, in order to increase the capacity of optical disks, it has been attempted to shorten the wavelength of a laser beam to be used for writing or reading of information and to further reduce the concavo-convex pit size on optical disks. At present, a laser beam having a wavelength of 780 nm is used for CD, and a laser beam having a wavelength of 660 nm is used for DVD. For optical recording media of next generation, use of a laser beam having a wavelength of from 300 to 450 nm is being studied. Accordingly, a liquid crystal element is desired which modulates a laser beam having a wavelength of from 300 to 450 nm (hereinafter referred to also as a blue laser beam).

As a material to obtain an optical element employing liquid crystal (hereinafter referred to also as a liquid crystal element), a polymer liquid crystal obtained by polymerizing a liquid crystal composition containing a compound represented by the following formula (1) (wherein Q is a 1,4-phenylene group or a trans-1,4-cyclohexylene group, and Z is an alkyl group) has, for example, been reported (Patent Document 1).

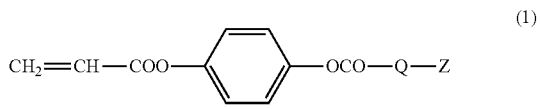

(1)

However, conventional materials such as polymer liquid crystals disclosed in Patent document 1 have had a problem that the durability against a blue laser beam is inadequate. Therefore, the present inventors have developed various polymerizable liquid crystal compounds (Patent Document 2) as materials having good durability against a blue laser beam. Further, e.g. PCT/JP2005/001839 and Japanese Patent Application No. 2005-301138 report on polymerizable liquid crystal compounds having good durability against a blue laser beam.

The polymerizable liquid crystal compounds disclosed in e.g. Patent Document 2, PCT/JP2005/001839 and Japanese Patent Application No. 2005-301138 are compounds which satisfy the properties required for the materials to be used for optical elements (such as a large value of refractive index anisotropy, low absorption of a laser beam and wavelength dispersion of refractive index) and which at the same time have good durability against a blue laser beam.

Further, an element employing a polymer liquid crystal is prepared via a polymerization step such as polymerization after injecting a polymerizable liquid crystal into a cell, or polymerization after applying a polymerizable liquid crystal on a substrate. Such polymerization is usually carried out by photopolymerization. In a case where a polymerizable liquid crystal is injected into a cell or it is applied on a substrate, it is necessary to heat the polymerizable liquid crystal, and in order to prevent thermal polymerization, it is common to add a polymerization inhibitor to the polymerizable liquid crystal. Particularly, injection of the polymerizable liquid crystal into a cell is usually carried out by injection under reduced pressure. Accordingly, the polymerization inhibitor is required to have a high boiling point in addition to a high polymerization inhibiting ability. As such a polymerization inhibitor, 2-n-dodecylphenol is, for example, used.

On the other hand, a liquid crystalline material mixture containing an additive selected from the group consisting of a light stabilizer, a heat stabilizer and/or an antioxidant, added to a liquid crystalline mixture, has been reported (Patent Document 3). Patent Document 3 discloses that a 2,2,6,6-tetramethylpyperidine derivative or an alkylated monophenol such as 2,6-di-t-butyl-4-methylphenol may be used as the component of the light stabilizer, the heat stabilizer and/or the antioxidant.

Patent Document 1: JP-A-10-195138
Patent Document 2: WO2005/014522
Patent Document 3: JP-A-2002-536529

DISCLOSURE OF THE INVENTION

Problems to be Solved by the Invention

However, even in a case where the materials disclosed in e.g. Patent Document 2, PCT/JP2005/001839 and Japanese Patent Application No. 2005-301138 are used, there has been cases where the optical modulation properties tended to deteriorate depending upon the conditions of use. Under the circumstances, the present inventors have conducted a study on incorporating a hindered amine compound to a polymerizable liquid crystal disclosed in the above references in order to improve the stability against a blue laser beam. However, as a result of an exposure test to a blue laser beam, it has been found that the durability sometimes deteriorates when a hindered amine compound is incorporated.

Means to Solve the Problems

The present invention has been made to solve the above problems and has an object to provide a liquid crystal optical modulation element which is capable of improving the durability against a blue laser beam with an element employing a polymer liquid crystal and which is thereby capable of modulating a blue laser beam constantly over a long period of time. Namely, the present invention provides the following:

(1) A liquid crystal optical modulation element to modulate a laser beam having a wavelength of at most 500 nm, which comprises a layer of a polymer liquid crystal composition sandwiched between a pair of transparent substrates facing each other, characterized in that each of the pair of transparent substrates has an alignment film on the surface which faces the other transparent substrate, and the polymer liquid crystal composition is a polymer liquid crystal containing a hindered amine compound and a hindered phenol compound.

(2) The liquid crystal optical modulation element according to the above (1), wherein the polymer liquid crystal composition is one obtainable by polymerizing a polymerizable liquid crystal composition comprising a polymerizable liquid crystal, a hindered amine compound and a hindered phenol compound.

(3) The liquid crystal optical modulation element according to the above (2), wherein the content of the hindered amine compound is from 0.05 to 5 mass % based on the polymerizable liquid crystal.

(4) The liquid crystal optical modulation element according to above (2) or (3), wherein the content of the hindered phenol compound is from 0.05 to 10 mass % based on the polymerizable liquid crystal.

(5) The liquid crystal optical modulation element according to any one of the above (2) to (4), wherein the polymerizable liquid crystal contains at least one of the following compounds (2) and (3):

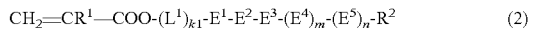

$$CH_2=CR^1-COO-(L^1)_{k1}-E^1-E^2-E^3-(E^4)_m-(E^5)_n-R^2 \quad (2)$$

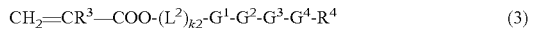

$$CH_2=CR^3-COO-(L^2)_{k2}-G^1-G^2-G^3-G^4-R^4 \quad (3)$$

wherein each of $R^1$ and $R^3$ is a hydrogen atom or a methyl group; $R^2$ is a $C_{1-8}$ alkyl group; $R^4$ is a $C_{1-8}$ alkyl group or a fluorine atom; $L^1$ is $-(CH_2)_{p1}O-$, $-(CH_2)_{q1}-$, -Cy-COO—, -Cy-OCO—, $-E^6-(CH_2)_2-$, $-E^7-CH_2O-$ or $-E^8-O-$ (wherein Cy is a trans-1,4-cyclohexylene group, each of p1 and q1 which are independent of each other, is an integer of from 2 to 8); $L^2$ is $-(CH_2)_{p2}O-$ or $-(CH_2)_{q2}-$ (wherein each of p2 and q2 which are independent of each other, is an integer of from 2 to 8); each of $E^1$, $E^2$, $E^3$, $E^4$, $E^5$, $E^6$, $E^7$ and $E^8$ which are independent of one another, is a 1,4-phenylene group or a trans-1,4-cyclohexylene group (provided that at least one of $E^1$, $E^2$ and $E^3$ is a trans-1,4-cyclohexylene group, and in a case where $L^1$ is -Cy-OCO—, $E^1$ is a trans-1,4-cyclohexylene group); $G^1$ is a 1,4-phenylene group, each of $G^2$, $G^3$ and $G^4$ which are independent of one another is a 1,4-phenylene group or a trans-1,4-cyclohexylene group, and at least one of $G^2$ and $G^3$ is a trans-1,4-cyclohexylene group (provided that the 1,4-phenylene group and trans-1,4-cyclohexylene group in $G^1$ to $G^4$ may be such that a hydrogen atom bonded to a carbon atom in each group may be substituted by a fluorine atom, a chlorine atom or a methyl group); and each of k1, k2, m and n which are independent of one another, is 0 or 1, provided that when k1 is 1 and $L^1$ is -Cy-COO—, -Cy-OCO—, $-E^6-(CH_2)_2-$, $-E^7-CH_2O-$ or $-E^8-O-$, at least one of m and n is 0.

(6) The liquid crystal optical modulation element according to any one of the above (1) to (5), which is used for a laser beam having a wavelength of from 300 to 450 nm.

(7) An optical head device comprising a light source for emitting a laser beam having a wavelength of at most 500 nm, an objective lens for converging the laser beam emitted from the light source on an optical recording medium, a photodetector for receiving the light converged and reflected on the optical recording medium, and the liquid crystal optical modulation element as defined in any one of the above (1) to (6), disposed in an optical path between the light source and the optical recording medium or in an optical path between the optical recording medium and the photodetector.

Effects of the Invention

According to the present invention, the optical modulation characteristics of a liquid crystal optical modulation element to modulate a blue laser beam can be well maintained.

BEST MODE FOR CARRYING OUT THE INVENTION

In this specification, a compound represented by the formula (1) will be referred to also as a compound (1). A group represented by the formula (A) will be referred to also as a group (A). The same applies to other compounds and groups. Further, the wavelength is meant to cover the range of the disclosed value ±2 nm even when it is disclosed by one point value. Further, "Ph" represents a 1,4-phenylene group, and "Cy" represents a trans-1,4-cyclohexylene group. A hydrogen atom in each group of Ph and Cy may be substituted by a fluorine atom, a chlorine atom or a methyl group.

The liquid crystal optical modulation element of the present invention is a liquid crystal optical modulation element to modulate a laser beam having a wavelength of at most 500 nm, which comprises a layer of a polymer liquid crystal composition sandwiched between a pair of transparent substrates facing each other, wherein each of the pair of transparent substrates has an alignment film on the surface which faces the other transparent substrate, and the polymer liquid crystal composition is a polymer liquid crystal containing a hindered amine compound and a hindered phenol compound.

As a method for sandwiching the polymer liquid crystal composition (hereinafter described in detail) between a pair of transparent substrates facing each other, the following methods may be mentioned, and preferred is method 1.

Method 1: A method wherein a cell is prepared by using a pair of transparent substrates, and a polymerizable liquid crystal composition described hereinafter, is injected into the cell, followed by polymerization.

Method 2: A method wherein a polymerizable liquid crystal composition is applied on a surface of one transparent substrate having an alignment film formed thereon, and then polymerized to form a polymer liquid crystal composition, and then a polymerizable liquid crystal composition is supplied, and another substrate provided with an alignment film is laminated, followed by polymerization.

Now, method 1 will be described in detail. The cell is assembled and prepared by disposing a pair of laminates each comprising a transparent substrate and an alignment film, so that the alignment film sides will face each other, and sealing the peripheral portion of the laminates with a sealing agent. The laminate is preferably a laminate formed by applying and drying a material for an alignment film on the surface of a transparent substrate, or a laminate formed by vapor-depositing a material for an alignment film on the surface of a transparent substrate.

The transparent substrate is preferably a transparent glass substrate or a transparent resin substrate, particularly preferably a transparent glass substrate as the rigidity is high. The thickness of the transparent substrate is preferably from 0.2 to 1.5 mm, particularly preferably from 0.3 to 1.1 mm. As the alignment film, an alignment film made of an organic substance such as an polyimide or an alignment film made of an inorganic material may be used. The alignment film made of an organic substance such as a polyimide is preferably such that the surface is subjected to rubbing treatment.

Preparation of the cell may be carried out by a usual method. For example, it may be prepared by the following method. Firstly, a pair of the above-mentioned laminates are prepared, and along the peripheral portion of the side of at least one of the laminates, on which an alignment film is formed, a sealing agent such as an epoxy resin is applied in a ring shape. To the sealing agent, spacers to obtain a desired cell gap, may preliminarily be incorporated. Then, the pair of laminates are disposed with a space (a cell gap) so that the alignment film sides face each other, and the sealing agent is cured to form an empty cell. The ring-shaped coated portion of the sealing agent is provided at least partially with a non-continuous portion which will be an injection inlet for a liquid crystal composition to be injected. Here, the cell gap is preferably from 1 to 10 µm, particularly preferably from 2 to 8 µm.

The construction of the liquid crystal optical modulation element is not limited to the above construction. For example, a reflection preventive film may be laminated on the side opposite to the side of the transparent substrate on which an alignment film is laminated, or a phase plate or the like may be laminated.

The polymer liquid crystal composition in the present invention is a composition such that a polymer liquid crystal contains a hindered amine compound and a hindered phenol compound. Such a polymer liquid crystal composition is preferably one obtainable by polymerizing a polymerizable liquid crystal composition comprising a polymerizable liquid crystal, a hindered amine compound and a hindered phenol compound.

The polymerizable liquid crystal is not particularly limited, but it may be a polymerizable liquid crystalline compound having one or two polymerizable functional groups and a mesogen structure, or a polymerizable liquid crystalline mixture having two or more such polymerizable liquid crystalline compounds mixed.

The polymerizable functional group is preferably an acryloyl group or a methacryloyl group, particularly preferably an acryloyl group. Further, the number of polymerizable functional groups is preferably one.

The mesogen structure preferably has the following structure, whereby the durability against a blue laser beam is good, and the value of the refractive index anisotropy (Δn) can be made large.

(a) It contains a trans-1,4-cyclohexylene group and a 1,4-phenylene group as cyclic groups, and the total number of such cyclic groups is from 3 to 5.

(b) Among such cyclic groups, at least one is a trans-1,4-cyclohexylene group, and at least two are 1,4-phenylene groups.

(c) In a case where at least three 1,4-phenylene groups are contained, the number of 1,4-phenylene groups directly bonded or continuously bonded via a connecting group having an unsaturated bond, is up to two. Accordingly, a trans-1,4-cyclohexylene group is interposed between 1,4-phenylene groups not to let three or more 1,4-phenylene groups be continuous.

(d) It contains no Ph-CO— structure.

Such a polymerizable liquid crystalline compound may, for example, be a compound represented by the following formula (2) (see PCT/JP2005/001839), a compound represented by the following formula (3) (see Japanese Patent Application No. 2005-301138) or a compound represented by the following formula (4) (see Patent Document 2). Preferred is the compound (2) or the compound (3).

$$CH_2=CR^1-COO-(L^1)_{k1}-E^1-E^2-E^3-(E^4)_m-(E^5)_n-R^2 \quad (2)$$

$$CH_2=CR^3-COO-(L^2)_{k2}-G^1-G^2-G^3-G^4-R^4 \quad (3)$$

$$CH_2=CR^5-COO-\underset{}{\bigcirc}-OCO-Cy-X^1-R^6 \quad (4)$$

Firstly, the compound (2) will be described. The symbols in the formula (2) have the following meanings.

$R^1$: A hydrogen atom or a methyl group.

$R^2$: A $C_{1-8}$ alkyl group.

$L^1$: —$(CH_2)_{p1}$O—, —$(CH_2)_{q1}$-, -Cy-COO—, -Cy-OCO—, -$E^6$-$(CH_2)_2$—, -$E^7$-$CH_2$O—, or -$E^8$-O— (wherein each of p1 and q1 which are independent of each other, is an integer of from 2 to 8).

$E^1$, $E^2$, $E^3$, $E^4$, $E^5$, $E^6$, $E^7$, $E^8$: Each independently a 1,4-phenylene group or a trans-1,4-cyclohexylene group (provided that at least one of $E^1$, $E^2$ and $E^3$ is a trans-1,4-cyclohexylene group, and in a case where $L^1$ is -Cy-OCO—, $E^1$ is a trans-1,4-cyclohexylene group).

k1, m, n: Each independently 0 or 1, provided that when k1 is 1 and $L^1$ is -Cy-COO—, -Cy-OCO—, -$E^6$-$(CH_2)_2$—, -$E^7$-$CH_2$O— or -$E^8$-O—, at least one of m and n is 0.

$R^1$ is preferably a hydrogen atom. When $R^1$ is a hydrogen atom, polymerization of the polymerizable liquid crystal composition readily proceeds, such being preferred. Further, there is an advantage such that the characteristics of the obtainable polymer liquid crystal composition are hardly susceptible to an influence of the external environment (such as the temperature), and the in-plane distribution of the retardation is small.

$R^2$ is a alkyl group, whereby $T_m$ (the crystal phase-nematic phase transition point) of the polymerizable liquid crystal composition can be made low. $R^2$ is preferably a $C_{2-6}$ alkyl group. Further, $R^2$ is preferably linear, since it is thereby possible to broaden the temperature range wherein the compound (2) shows liquid crystallinity.

$L^1$ is —$(CH_2)_{p1}$O—, —$(CH_2)_{q1}$—, -Cy-COO—, -Cy-OCO—, -$E^6$-$(CH_2)_2$—, -$E^7$-$CH_2$O— or -$E^8$-O— (wherein each of p1 and q1 which are independent of each other, is an integer of from 2 to 8, preferably an integer of from 4 to 6, and each of $E^6$, $E^7$ and $E^8$ is a 1,4-phenylene group or a trans-1,4-cyclohexylene group, preferably a non-substituted group).

$L^1$ is preferably -Cy-COO—, -Cy-OCO—, —$(CH_2)_{p1}$O— (preferably —$(CH_2)_6$O—) or -Ph-$(CH_2)_2$O—.

In a case where $L^1$ is -Cy-COO—, Δn of the polymer liquid crystal composition obtainable by the polymerization, can be made large. $L^1$ is preferably -Cy-OCO— from such a viewpoint that the compatibility with another polymerizable liquid crystal is good, and $T_m$ can be made low.

Further, in general, when the polymerizable liquid crystal is polymerized, the value of Δn tends to decrease between before and after the polymerization reaction. However, when $L^1$ is a group having a polymethylene group such as —$(CH_2)_{p1}$O— or —$(CH_2)_{q1}$-, the decrease in the Δn value between before and after the polymerization reaction can be suppressed.

Each of k1, m and n which are independent of one another, is 0 or 1, provided that when k1 is 1 and $L^1$ is -Cy-COO—, -Cy-OCO—, -$E^6$-$(CH_2)_2$—, -$E^7$-$CH_2$O— or -$E^8$-O—, at least one of m and n is 0.

Each of $E^1$, $E^2$, $E^3$, $E^4$ and $E^5$ which are independent of one another, is a 1,4-phenylene group or a trans-1,4-cyclohexylene group. The number of cyclic groups which the compound (2) has, is from 3 to 5, provided that at least one of $E^1$, $E^2$ and $E^3$ is Cy, and in a case where $L^1$ is -Cy-OCO—, $E^1$ is a trans-1,4-cyclohexylene group. Further, at least one of $E^1$, $E^2$ and $E^3$ is preferably Ph. Further, in a case where a plurality of Ph are contained, the number of Ph connected by direct bonding is preferably 2.

The structure of "$E^1$-$E^2$-$E^3$" is preferably "Cy-Ph-Ph", whereby Δn of the compound (2) can be made large. It is thereby made easy to prepare a liquid crystal composition showing a larger Δn. Further, from such a viewpoint that absorption of a blue laser beam can be suppressed, "Cy-Ph-Cy" is preferred.

The compound (2) is preferably the following compound (2A) or the following compound (2B) (Ph and Cy in the examples of the compound (2) are preferably non-substituted groups, respectively.)

$CH_2$=$CR^1$—COO-$L^1$-$E^1$-$E^2$-$E^3$-$R^2$      (2A)

$CH_2$=$CR^1$—COO-$E^1$-$E^2$-$E^3$-$R^2$      (2B)

As the compound (2A), the following compounds are preferred.

$CH_2$=$CR^1$—COO-Cy-COO-$E^1$-$E^2$-$E^3$-$R^2$      (2Aa)

$CH_2$=$CR^1$—COO-Cy-OCO-$E^1$-$E^2$-$E^3$-$R^2$      (2Ab)

$CH_2$=$CR^1$—COO—$(CH_2)_p$O-$E^1$-$E^2$-$E^3$-$R^2$      (2Ac)

$CH_2$=$CR^1$—COO-Ph-$(CH_2)_2$-$E^1$-$E^2$-$E^3$-$R^2$      (2Ad)

Specifically, the following compounds are preferred, provided that a represents an integer of from 1 to 8.

$CH_2$=$CR^1$—COO-Cy-COO-Cy-Ph-Ph-$(CH_2)_a$H      (2Aa1)

$CH_2$=$CR^1$—COO-Cy-COO-Cy-Ph-Cy-$(CH_2)_a$H      (2Aa2)

$CH_2$=$CR^1$—COO-Cy-OCO-Cy-Ph-Ph-$(CH_2)_a$H      (2Ab1)

$CH_2$=$CR^1$—COO-Cy-OCO-Cy-Ph-Cy-$(CH_2)_a$H      (2Ab2)

$CH_2$=$CR^1$—COO—$(CH_2)_{p1}$O-Ph-Cy-Ph-$(CH_2)_a$H      (2Ac1)

$CH_2$=$CR^1$—COO-Ph-$(CH_2)_2$-Ph-Ph-Cy-$(CH_2)_a$H      (2Ad1)

Among them, the compounds wherein $R^1$ is a hydrogen atom are preferred, and the compounds wherein a is from 2 to 6 are particularly preferred. Further, with respect to the compound (2Ac1), the compound wherein p1 is from 4 to 6 is preferred, and the compound wherein p1 is 6, is particularly preferred.

The compound (2B) is preferably the following compound (2Ba) or the following compound (2Bb).

$CH_2$=$CR^1$—COO-Ph-Cy-Ph-$R^2$      (2Ba)

$CH_2$=$CR^1$—COO-Ph-Ph-Cy-$R^2$      (2Bb)

Specifically, the following compounds are preferred, provided that a represents an integer of from 1 to 8. Among them, the compounds wherein $R^1$ is a hydrogen atom, and a is from 2 to 6, are particularly preferred.

$CH_2$=$CR^1$—COO-Ph-Cy-Ph-$(CH_2)_a$H      (2Ba1)

$CH_2$=$CR^1$—COO-Ph-Ph-Cy-$(CH_2)_a$H      (2Bb1)

Now, the compound (3) will be described. The symbols in the formula (3) have the following meanings.

$CH_2$=$CR^3$—COO-$(L^2)_{k2}$-$G^1$-$G^2$-$G^3$-$G^4$-$R^4$      (3)

$R^3$: A hydrogen atom or a methyl group.
$R^4$: A $C_{1-8}$ alkyl group or a fluorine atom.
k2: 0 or 1.
$L^2$: —$(CH_2)_{p2}$O— or —$(CH_2)_{q2}$— (wherein each of p2 and q2 which are independent of each other, is an integer of from 2 to 8).
$G^1$: A 1,4-phenylene group.
$G^2$, $G^3$, $G^4$: Each independently a 1,4-phenylene group or a trans-1,4-cyclohexylene group, and at least one of $G^2$ and $G^3$ is a trans-1,4-cyclohexylene group.

However, the 1,4-phenylene group and the trans-1,4-cyclohexylene group in $G^1$, $G^2$, $G^3$ and $G^4$ may be such that a hydrogen atom bonded to a carbon atom in such a group may be substituted by a fluorine atom, a chlorine atom or a methyl group.

Preferred embodiments of $R^3$ are the same as those of $R^1$.

$R^4$ is a $C_{1-8}$ alkyl group or a fluorine atom, whereby the melting point ($T_m$) (namely, the crystal phase-nematic phase transition point) of the polymerizable liquid crystal composition containing the compound (3) can be made low. $R^4$ is more preferably a $C_{2-6}$ alkyl group or a fluorine atom. Further, when $R^4$ is an alkyl group, it is preferably of a linear structure, whereby the temperature range wherein the compound (3) shows liquid crystallinity, can be broadened.

k2 is 0 or 1, and preferably 1 in the present invention.
$L^2$ is -$(CH_2)_{p2}$O— or -$(CH_2)_{q2}$-, preferably —$(CH_2)_{p2}$O—.

Also in the case of the compound (3), when $L^2$ is a group having a polymethylene group such as —$(CH_2)_{p2}$O— or —$(CH_2)_{q2}$—, the decrease in the Δn value between before and after the polymerization can be suppressed.

$G^1$ is a 1,4-phenylene group, and each of $G^2$, $G^3$ and $G^4$ which are independent of one another, is a 1,4-phenylene group or a trans-1,4-cyclohexylene group. The number of cyclic groups which the compound (3) has, is 4, and at least one of $G^2$ and $G^3$ is Cy. Further, at least one of $G^2$, $G^3$ and $G^4$ is preferably Ph. Further, in a case where a plurality of Ph are contained, two Ph are preferably adjacent to each other, whereby the value of Δn can be made large. However, if three or more Ph are directly bonded, the durability against a blue laser may deteriorate. In the compound (3), when at least one of $G^2$ and $G^3$ is Cy, there is no possibility that three or more Ph are directly bonded one another.

The structure of "$G^1$-$G^2$-$G^3$-$G^4$" may be "Ph-Ph-Cy-Ph", "Ph-Cy-Ph-Ph", "Ph-Ph-Cy-Cy", "Ph-Cy-Cy-Ph", "Ph-Cy-Ph-Cy" or "Ph-Cy-Cy-Cy". Among them, "Ph-Cy-Ph-Ph", "Ph-Ph-Cy-Cy" and "Ph-Ph-Cy-Ph" are preferred, since Δn of the compound (1) can be made large. It is thereby made easy to prepare a polymerizable liquid crystal composition showing a larger Δn. As the compound (3), the following compounds (3A) to (3C) are preferred.

$$CH_2=CR^3\text{---}COO\text{-}L^2\text{-}Ph\text{-}Ph\text{-}Cy\text{-}Cy\text{-}R^4 \quad (3A)$$

$$CH_2=CR^3\text{---}COO\text{-}L^2\text{-}Ph\text{-}Cy\text{-}Ph\text{-}Ph\text{-}R^4 \quad (3B)$$

$$CH_2=CR^3\text{---}COO\text{-}L^2\text{-}Ph\text{-}Ph\text{-}Cy\text{-}Ph\text{-}R^4 \quad (3C)$$

Among them, the compounds wherein $R^3$ is a hydrogen atom, and $R^4$ is a $C_{2-6}$ linear alkyl group or a fluorine atom, are preferred, and the compounds wherein -$L^2$- is —$(CH_2)_{p2}$O— (p2 is particularly preferably an integer of from 4 to 6) are particularly preferred.

Further, the 1,4-phenylene group and the trans-1,4-cyclohexylene group in $G^1$, $G^2$, $G^3$ and $G^4$ may be such that a hydrogen atom bonded to a carbon atom in such a group may be substituted by a fluorine atom, a chlorine atom or a methyl group. In the present invention, the 1,4-phenylene group is preferably a non-substituted group, a group substituted by one fluorine atom, or a group substituted by one methyl group. In a case where the 1,4-phenylene group has such a substituent, there may be effects to lower the melting point and to lower the viscosity of the compound (3). Further, the position of such a substituent is preferably at the 2- or 3-position. Further, the trans-1,4-cyclohexylene group is preferably a non-substituted group.

As the compound (3), the following compounds are preferred, and the compounds (3A-1), (3A-3), (3A-5), (3B-1), (3B-3), (3B-4), (3B-5), (3C-1) and (3C-2) are particularly preferred. In the formulae, p2 is as defined above and is preferably an integer of from 4 to 6. $R^{41}$ is a $C_{1-8}$ alkyl group, preferably a $C_{2-6}$ linear alkyl group.

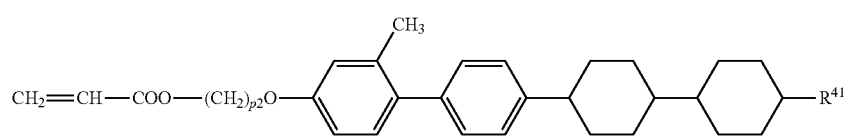
(3A-1)

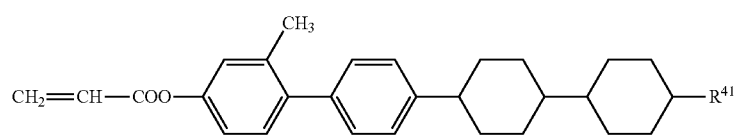
(3A-2)

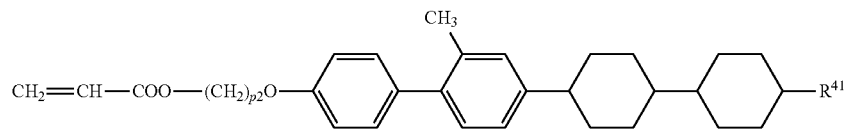
(3A-3)

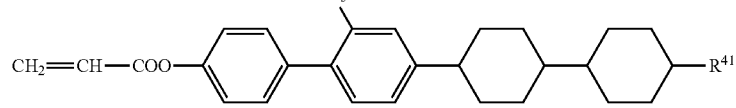
(3A-4)

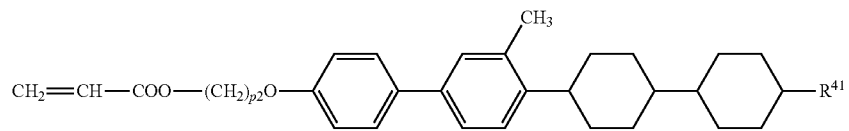
(3A-5)

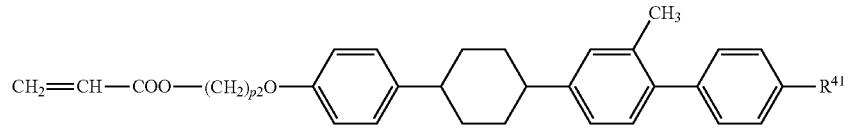
(3B-1)

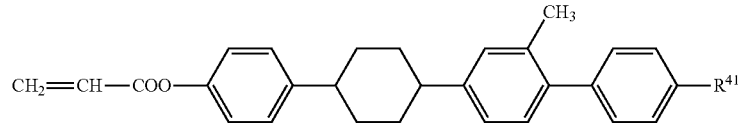
(3B-2)

-continued

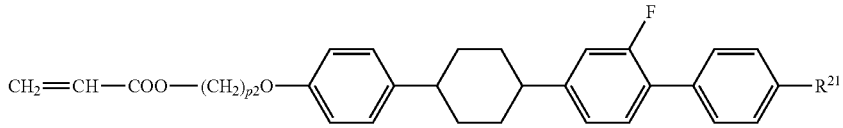
(3B-3)

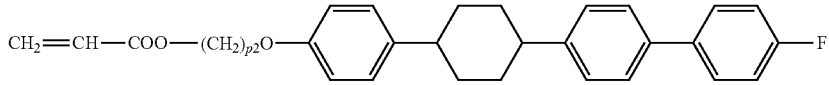
(3B-4)

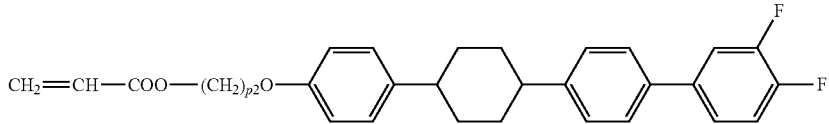
(3B-5)

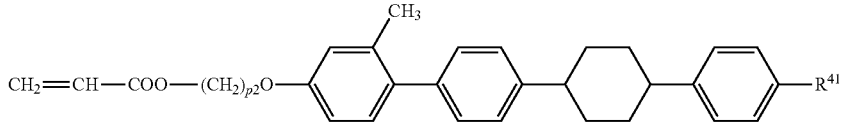
(3C-1)

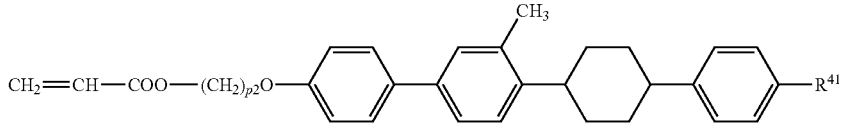
(3C-2)

Now, the compound (4) will be described. The symbols in the formula (4) have the following meanings.

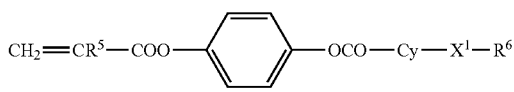
(4)

$R^5$: A hydrogen atom or a methyl group.
$R^6$: A $C_{1-8}$ alkyl group.
Cy: A trans-1,4-cyclohexylene group.
$X^1$: A 1,4-phenylene group or a trans-1,4-cyclohexylene group.

However, the above 1,4-phenylene group and trans-1,4-cyclohexylene group may be such that a hydrogen atom in such a group may be substituted by a fluorine atom, a chlorine atom or a methyl group.

Preferred embodiments of $R^5$ are the same as those of $R^1$, and preferred embodiments of $R^6$ are the same as those of $R^2$.

$X^1$ is a 1,4-phenylene group or a trans-1,4-cyclohexylene group. In a case where $X^1$ is a 1,4-phenylene group, among three cyclic groups contained in the compound (4), two will be 1,4-phenylene groups. Accordingly, as compared with a compound wherein all of the three cyclic groups are 1,4-phenylene groups, it is stable against a blue laser beam, and as compared with a compound having only one 1,4-phenylene group, the optical anisotropy such as the refractive index anisotropy will be large. Accordingly, it will be easy to obtain the desired optical anisotropy even when a liquid crystal composition for a diffraction element requiring a particularly large retardation value is to be prepared. Further, the degree of freedom in preparation of the liquid crystal composition will be broadened. When $X^1$ is a trans-1,4-cyclohexylene group, the stability of the compound (4) against a blue laser beam, can further be improved, and the nematic phase-isotropic phase transition point can be made high.

In the compound (4), the 1,4-phenylene group and the trans-1,4-cyclohexylene group may be non-substituted groups, or a hydrogen atom bonded to a carbon atom in such a group may be substituted by a fluorine atom, a chlorine atom or a methyl group. A non-substituted group is preferred from such a viewpoint that the nematic phase-isotropic phase transition point of the compound (4) can be made high.

As specific examples of the compound (4), the following compounds may be mentioned, provided that b is an integer of from 1 to 8. Among the following compounds, a compound wherein $R^5$ is a hydrogen atom, and b is from 2 to 6, is particularly preferred (Ph and Cy in examples of the compound (4) are preferably non-substituted groups, respectively.)

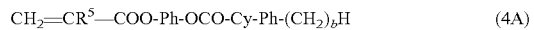
(4A)

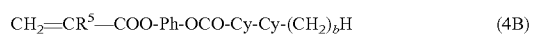
(4B)

Among the compounds (2) to (4), the following polymerizable liquid crystalline compounds are preferred.

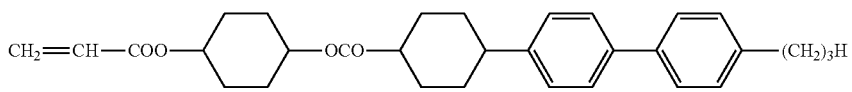
(2Ab1-1)

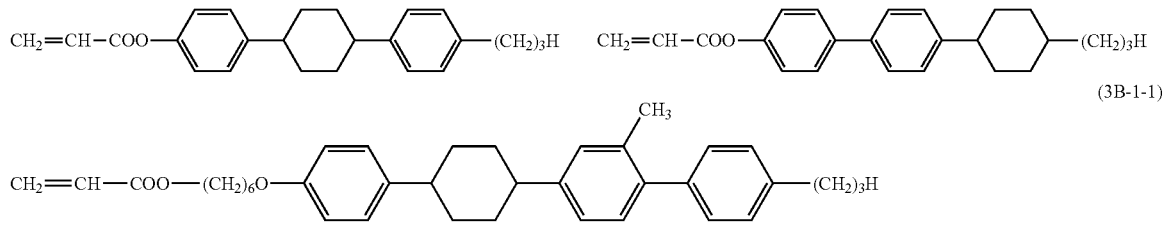

Further, solely with the polymerizable liquid crystalline compounds having at least three cyclic groups such as the above compounds (2) to (4), there may be a case where the crystal phase-nematic phase transition point of the polymerizable liquid crystal composition tends to be high, and the operation efficiency tends to deteriorate. In such a case, it is preferred to use another polymerizable liquid crystalline compound in combination with the above compounds (2) to (4). As such another polymerizable liquid crystal compound, the following compound (5) is preferred.

$$CH_2=CR^7—COO—(N)_r—W^8—W^9—R^8 \quad (5)$$

The symbols in the formula have the following meanings.
$R^7$: A hydrogen atom or a methyl group.
$R^8$: A $C_{1-8}$ alkyl group.
r: 0 or 1.
N: —$(CH_2)_sO$— or —$(CH_2)_t$— (wherein each of s and t which are independent of each other, is an integer of from 2 to 8).
$W^8$, $W^9$: Each independently a 1,4-phenylene group or a trans-1,4-cyclohexylene group, provided that the above 1,4-phenylene group and trans-1,4-cyclohexylene group are such that a hydrogen atom bonded to a carbon atom in such a group may be substituted by a fluorine atom, a chlorine atom or a methyl group.

Specifically, the following compounds (5A) to (5D) are preferred, and the following compound (5A) is particularly preferred, provided that c is an integer of from 1 to 8, preferably from 2 to 6.

$$CH_2=CR^7—COO\text{-Cy-Cy-}(CH_2)_cH \quad (5A)$$

$$CH_2=CR^7—COO\text{-Cy-Ph-}(CH_2)_cH \quad (5B)$$

$$CH_2=CR^7—COO\text{-Ph-Cy-}(CH_2)_cH \quad (5C)$$

$$CH_2=CR^7—COO\text{-Ph-Ph-}(CH_2)_cH \quad (5D)$$

Specifically, the following compound (5A-1) is preferred.

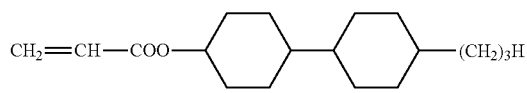
(5A-1)

The polymerizable liquid crystal is preferably a mixture comprising at least one compound (2) and at least one compound (3), or a mixture comprising at least one compound selected from the compound (2) and the compound (3) and at least one compound (5).

In the former, the amount of the compound (2) is preferably from 30 to 70 mol %, particularly preferably from 40 to 60 mol %, based on the total polymerizable liquid crystal. The amount of the compound (3) is preferably from 30 to 70 mol %, particularly preferably from 40 to 60 mol %, based on the total polymerizable liquid crystal.

In the latter, the total amount of the compound (2) and the compound (3) is preferably from 5 to 90 mol %, particularly preferably from 10 to 60 mol %, based on the total polymerizable liquid crystal. The amount of other polymerizable liquid crystal such as the compound (5) is preferably from 10 to 95 mol %, particularly preferably from 40 to 90 mol %, based on the total polymerizable liquid crystal.

As the polymerizable liquid crystal, the following polymerizable liquid crystalline mixtures are preferred.

A polymerizable liquid crystalline mixture comprising the compound (2Bb1-1) and the compound (5A-1).

A polymerizable liquid crystalline mixture comprising the compound (2Ab1-1) and the compound (5A-1).

A polymerizable liquid crystalline mixture comprising the compound (3B-1-1) and the compound (2Ba1-1).

As the hindered amine compound in the present invention, a compound having at least one group represented by the following formula (A) is preferred, and a 2,2,6,6-tetraalkylpyperidine derivative is particularly preferred. Here, hindered amine compounds may be used alone or in combination as a mixture of two or more of them.

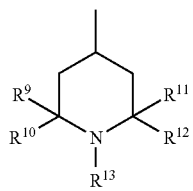
(A)

In the formula, each of $R^9$, $R^{10}$, $R^{11}$ and $R^{12}$ is an alkyl group or a phenyl group, and $R^{13}$ is a hydrogen atom, an alkyl group or an alkoxy group.

As $R^9$, $R^{10}$, $R^{11}$ and $R^{12}$, an alkyl group is preferred. Such a group may be of a linear structure or a branched structure, preferably of a linear structure. As $R^9$, $R^{10}$, $R^{11}$ and $R^{12}$, an ethyl group or a methyl group is preferred, and a methyl group is particularly preferred. $R^9$, $R^{10}$, $R^{11}$ and $R^{12}$ may be the same groups or different groups, preferably the same groups. It is particularly preferred that all of $R^9$, $R^{10}$, $R^{11}$ and $R^{12}$ are methyl groups.

In a case where $R^{13}$ is an alkyl group, it is preferably a $C_{1-4}$ linear alkyl group, particularly preferably a methyl group. In a case where $R^{13}$ is an alkoxy group, such an alkoxy group may be of a linear structure, a branched structure or of a structure having partially a ring, preferably of a linear structure. The number of carbon atoms constituting such an alkoxy group is from 1 to 18, preferably from 1 to 10. Such an alkoxy group may, for example, be a n-octyloxy group, a n-propyloxy group or a n-hexyloxy group, and a n-octyloxy group is preferred. $R^{13}$ is preferably a hydrogen atom, a methyl group or a n-octyloxy group, and a methyl group is particularly preferred since the stabilizing effect against a blue laser beam is high.

As the group represented by the formula (A), the following group (A1), the following group (A2) or the following group (A3) is preferred.

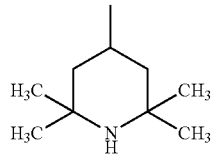
(A1)

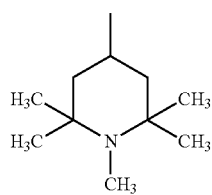
(A2)

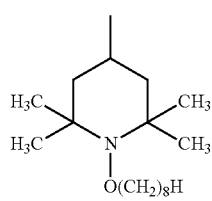
(A3)

As the hindered amine compound in the present invention, the following compounds may, for example, be mentioned, and a compound having at least two 2,2,6,6-tetraalkylpyperidine rings, is preferred.

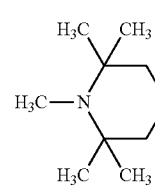
(A1-1)

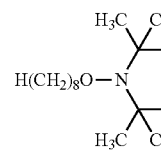
(A2-1)

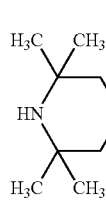 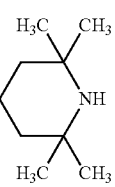
(A3-1)

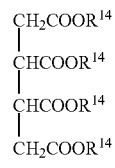
(A1-2)

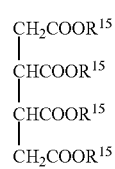
(A2-2)

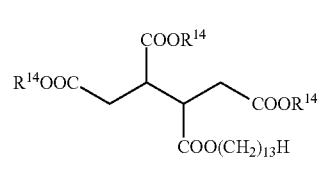
(A1-3)

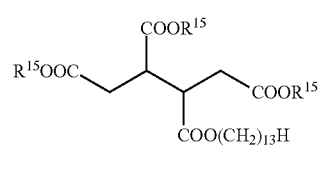
(A2-3)

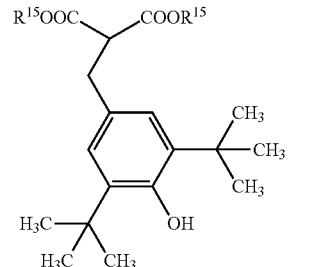
(A2-4)

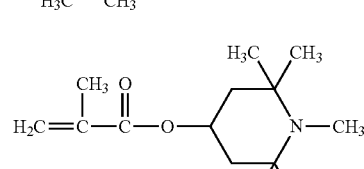
(A2-5)

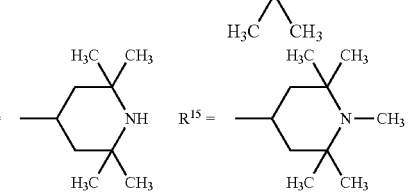

The hindered phenol compound in the present invention is a compound having substituents at both the 2- and 6-positions to the phenolic hydroxyl group. As such substituents, a methyl group or a t-butyl group is preferred, and a t-butyl group is particularly preferred. The combination of the substituents and the substituted positions may, for example, be as follows:

(i) a case where the 2-position is substituted by a methyl group, and the 6-position is substituted by a t-butyl group, (ii) a case where the 2-position is substituted by a t-butyl group, and the 6-position is substituted by a methyl group, (iii) a case where both the 2- and 6-positions are substituted by methyl groups, and (iv) a case where both the 2- and 6-position are substituted by t-butyl groups. The case (iv) is preferred.

The hindered phenol compound may be any one of monophenols, bisphenols and polyphenols and may be suitably selected for use among compounds commercially available as phenol type antioxidants. Such hindered phenol compounds may be used alone or in combination as a mixture of two or more of them.

As the hindered phenol compound, the following compounds may, for example, be mentioned, and a compound having at least two phenols is preferred.

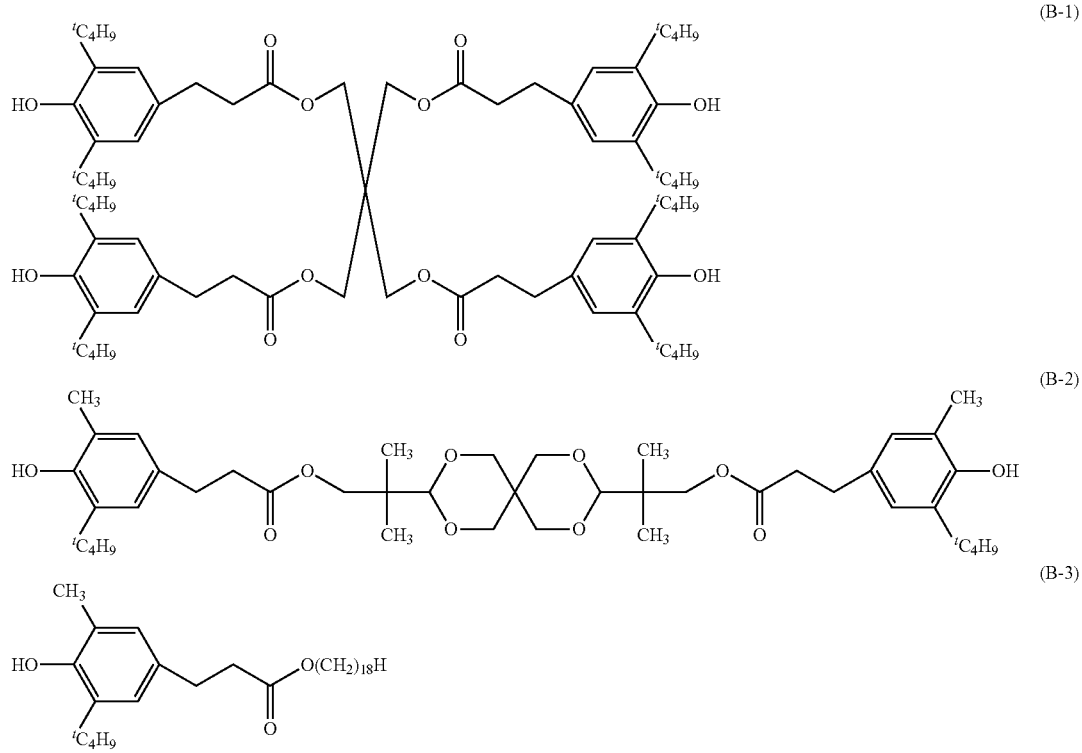

The content of the hindered amine compound is preferably from 0.05 to 5 mass %, particularly preferably from 0.1 to 1 mass %, based on the polymerizable liquid crystal. When the content of the hindered amine compound is from 0.05 to 5 mass %, the light resistance can be improved without presenting an influence over the polymerization behavior of the polymerizable liquid crystal composition.

Whereas, the content of the hindered phenol compound is preferably from 0.05 to 10 mass %, particularly preferably from 0.1 to 5 mass %, based on the polymerizable liquid crystal. When the content of the hindered phenol compound is from 0.05 to 10 mass %, the light resistance can be improved without presenting an influence over the polymerization behavior of the polymerizable liquid crystal composition. Further, the hindered phenol compound has a polymerization inhibiting ability. Accordingly, if its amount is too much, polymerization of the polymerizable liquid crystal composition is likely not to proceed, and if its amount is too small, polymerization by e.g. heat is likely to proceed.

The ratio of the hindered amine compound to the hindered phenol compound in the polymer liquid crystal composition is preferably from 0.1 to 50, particularly preferably from 0.5 to 30 by the mass ratio of hindered amine compound/hindered phenol compound.

In the polymer liquid crystal composition obtained by polymerizing the polymerizable liquid crystal composition containing the hindered amine compound and the hindered phenol compound within the above ranges, the content of the hindered amine compound will be from about 0.05 to 5 mass %, based on the polymer liquid crystal, and the content of the hindered phenol compound will be from about 0.05 to 10 mass %, based on the polymer liquid crystal.

Further, in order to let the polymerization proceed smoothly, the polymerizable liquid crystal composition preferably contains a polymerization initiator. The polymerization is carried out by photopolymerization, and accordingly, the polymerization initiator is suitably selected from photopolymerization initiators such as acetophenones, benzophenones, benzoins, benzyls, Michler ketones, benzoin alkyl ethers, benzyl dimethyl ketals and thioxanthones. With such a photopolymerization initiator, its residue will remain in the polymer liquid crystal composition, and therefore, it preferably has a low absorption of a blue laser beam. As such a polymerization initiator, Irgacure 754 (manufactured by Ciba Specialty Chemicals K.K.) may, for example, be mentioned. The amount of the polymerization initiator is preferably from 0.1 to 5 mass %, particularly preferably from 0.3 to 2 mass %, based on the entire amount of the polymerizable liquid crystal.

The polymerizable liquid crystal composition in the present invention may contain components (hereinafter referred to as other components) other than the polymerizable liquid crystal, the hindered amine compound, the hindered phenol compound and the polymerization initiator. As such other components, a chiral compound, an ultraviolet absorber and a dichroic dye may, for example, be mentioned. Further, the hindered phenol compound has a polymerization-inhibiting ability, and accordingly, in the present invention, a polymerization inhibitor may not necessarily be used, but in some cases, a polymerization inhibitor may be used.

The proportion of other components is preferably adjusted depending upon the particular application. For example, when a chiral compound is to be used as other component, the amount of the chiral compound is preferably from 5 to 80 mass %, particularly preferably from 5 to 50 mass %, based on the polymer liquid crystal. Here, as the chiral compound, a non-polymerizable chiral compound or a polymerizable chiral compound may be used.

When a dichroic dye is to be used as other component, the amount of the dichroic dye is preferably from 1 to 20 mass %, particularly preferably from 3 to 18 mass %, based on the polymer liquid crystal.

When an ultraviolet absorber is to be used as other component, it is preferably at most 5 mass %, particularly preferably at most 2 mass %, based on the polymer liquid crystal.

In the present invention, the above polymerizable liquid crystal composition is injected into a cell, followed by polymerization to obtain a polymer liquid crystal composition. The polymerization is preferably carried out in a state where the polymerizable liquid crystal composition shows a liquid crystal phase and in a state where the liquid crystal is aligned. In order to maintain the state where the polymerizable liquid crystal composition shows a liquid crystal phase, the ambient temperature may be controlled to be at most the nematic phase-isotropic phase transition temperature ($T_c$). However, at a temperature close to $T_c$, $\Delta n$ of the polymerizable liquid crystal composition is very small, and accordingly, the upper limit of the ambient temperature is preferably at most ($T_c$-10)° C. Further, the polymerization is preferably carried out by photopolymerization.

The polymer liquid crystal composition prepared by the above process may be used as it is sandwiched between transparent substrates or may be used as peeled from the transparent substrates and supported on another substrate.

The liquid crystal optical modulation element of the present invention modulates a laser beam having a wavelength of at most 500 nm, preferably a laser beam having a wavelength of from 350 to 500 nm, particularly preferably a laser beam having a wavelength of from 350 to 450 nm. Specifically, there is a case where the polarization state or the wavefront state of the blue laser beam which entered the liquid crystal optical modulation element is modulated. Modulation of the polarization state may, for example, be a case where the entering linearly polarized light is modulated to an elliptically polarized light, a case where it is modulated to a circularly polarized light or a case where it is modulated to a linearly polarized light at right angles to the incident polarized light, and a liquid crystal optical modulation element having such a function can be utilized as a polarized light conversion element. The polarized light conversion element can be used as a light quantity control element as combined with a polarization beam splitter or a polarizing plate. Further, the liquid crystal optical modulation element to modulate the wavefront state can be utilized e.g. as an aberration correction element. Specifically, an aberration correction element to prevent reading error or an aberration correction element to suppress aberration simultaneously at all the wavelengths in the multi-wavelength compatible optical head device which compatibly employs at least two different wavelengths, may, for example, be mentioned. Further, it may be used also as a diffraction element such as a diffraction grating.

Further, the above polarized light conversion element, light quantity control element, aberration correction element and diffraction element may be applied not only to an optical head device but also to a projector.

EXAMPLES

Now, the present invention will be described in detail with reference to Examples, but it should be understood that the present invention is by no means thereby restricted. Here, Examples 1 to 4, 7, 9 to 11, 14 and 15 are Comparative Examples, and Examples 5, 6, 8, 12, 13 and 16 are Working Examples of the present invention.

(1) Preparation of Cell (1-1) Preparation Example for Cell

On a glass substrate of 5 cm×5 cm×0.5 mm in thickness, a polyimide solution was applied by a spin coater and dried, followed by rubbing treatment in a prescribed direction by means of nylon cloth to prepare a transparent substrate. Two such substrates were bonded by means of an adhesive so that the surfaces having alignment treatment applied, faced each other, thereby to prepare a cell. To the adhesive, glass beads having a diameter of 4 μm were added, and the distance between the substrates became 4 μm.

(2) Preparation of Polymerizable Liquid Crystal Composition

As the polymerizable liquid crystalline compound, the following compound (2Ab1-1), the following compound (2Bb1-1), the following compound (2Bb1-2), the following compound (2Ba1-1), the following compound (3B-1-1), the following compound (5A-1) and the following compound (5A-2) were used. As a hindered amine compound, the following compound (A2-3) (product No.: LA62, manufactured by Asahi Denka Kogyo K.K.) and the following compound (A3-1) (product No.: TINUVIN123, manufactured by Ciba Specialty Chemicals K.K.) were used. As the hindered phenol compound, the following compound (B-1) (product No.: AO60, manufactured by Asahi Denka Kogyo K.K.) and the following compound (B-4) (product No. AO50, manufactured by Asahi Denka Kogyo K.K.) were used. As the polymerization initiator, Irgacure 754 (manufactured by Ciba Specialty Chemicals K.K.) was used. Further, 2-n-dodecylphenol (hereinafter referred to simply as 2NDP, manufactured by Tokyo Kasei Kogyo Co., Ltd.) was used.

Compound (2Bb1-1) and compound (5A-2) were mixed in a molar ratio of 28:72 to obtain polymerizable liquid crystal 1. Further, compound (2Bb1-1), compound (2Bb1-2), compound (5A-1) and compound (5A-2) were mixed in a molar ratio of 14:14:36:36 to obtain polymerizable liquid crystal 2. Further, compound (2Ab1-1), compound (5A-1) and compound (5A-2) were mixed in a molar ratio of 50:25:25 to obtain polymerizable liquid crystal 3. Further, (2Ba1-1) and compound (3B1-1) were mixed in a molar ratio of 45:55 to obtain polymerizable liquid crystal 4.

Then, to these polymerizable liquid crystals 1 and 2, the hindered amine compound, the hindered phenol compound and the polymerization initiator were mixed in the proportions shown in Tables 1 to 4 to prepare polymerizable liquid crystal compositions. Here, the hindered amine compound, the hindered phenol compound and the polymerization initiator are represented by mass % values, respectively, based on the polymerizable liquid crystal. Further, the nematic phase-isotropic phase transition point of the compositions using such polymerizable liquid crystal 1 and polymerizable liquid crystal 2 was at least 125° C. in each case. The nematic phase-isotropic phase transition point of the compositions using polymerizable liquid crystal 3 was at least 200° C. and not measurable, since they underwent thermal polymerization. Further, the crystal phase-nematic phase transition point of the compositions using polymerizable liquid crystal 3 was in the vicinity of 100° C. in each case. Further, the nematic phase-isotropic phase transition point of the compositions using polymerizable liquid crystal 4 was at least 155° C. in each case.

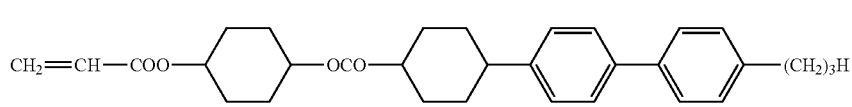
(2Ab1-1)
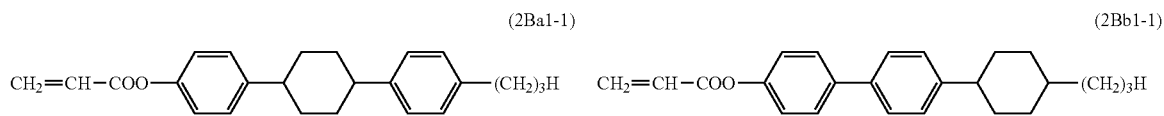
(2Ba1-1) (2Bb1-1)
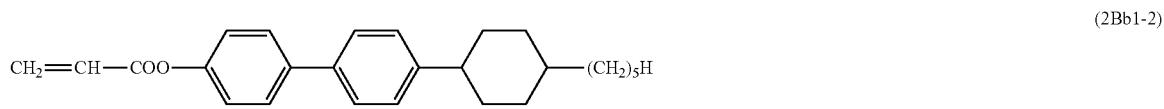
(2Bb1-2)
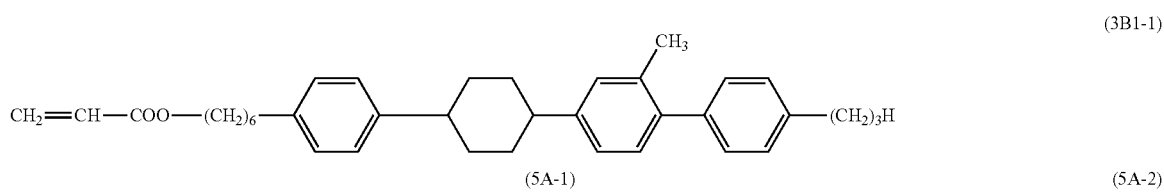
(3B1-1)
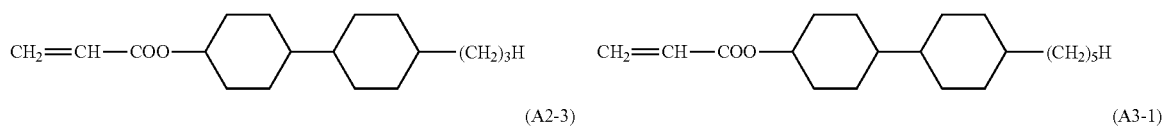
(5A-1) (5A-2)
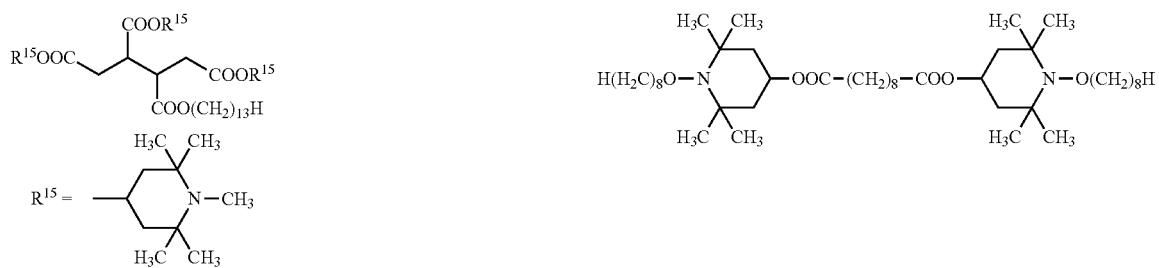
(A2-3) (A3-1)
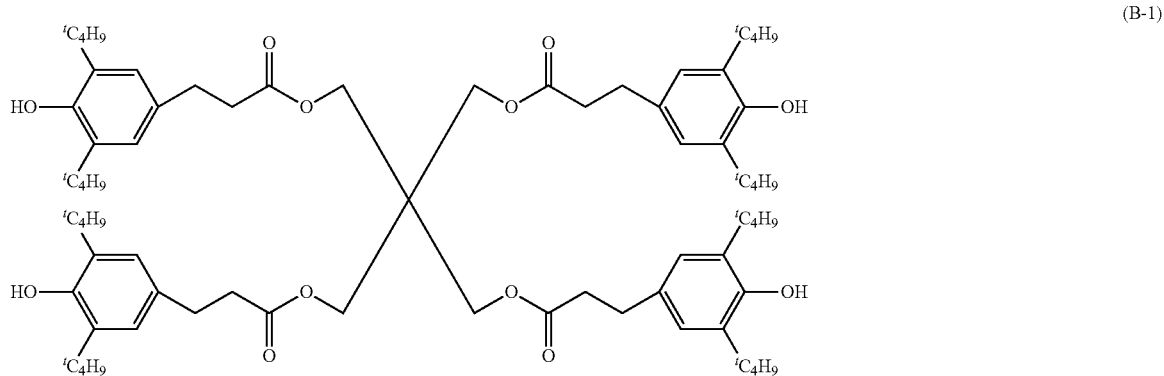
(B-1)
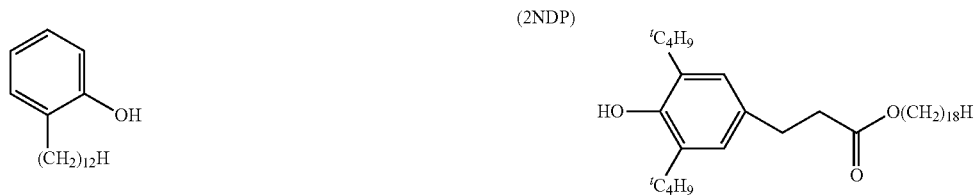
(2NDP) (B-4)

Compound (2Bb1-1) was prepared as follows.
Preparation of Compound (2Bb1-1)
Preparation Example for Compound (Q-1)

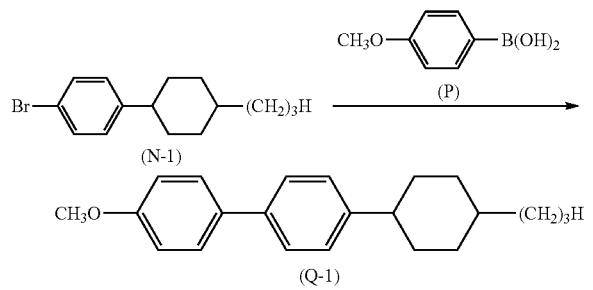

Into a 1 L four-necked flask equipped with a reflux condenser and a stirrer, compound (N-1) (18.2 g, 0.064 mol), compound (P) (9.75 g, 0.064 mol), Pd[P($C_6H_5$)$_3$]$_4$ (5.55 g, 0.0048 mol), a 20% sodium carbonate aqueous solution (400 mL) and tetrahydrofuran (640 mL) were added, and in a nitrogen stream, a reaction was carried out at 70° C. for 24 hours. After completion of the reaction, water and diethyl ether were added for liquid separation, and an organic layer was recovered. The recovered organic layer was washed with a saturated sodium chloride aqueous solution (40 mL) and then washed with water, and an organic layer was again recovered. The organic layer was dried over anhydrous magnesium sulfate and then subjected to filtration under reduced pressure to remove anhydrous magnesium sulfate. The filtrate was purified by column chromatography (developer: dichloromethane/hexane=5/5 by volume ratio) to obtain a fraction containing the desired product. The fraction was concentrated to obtain powdery crystal. To this powdery crystal, a solvent mixture (90 mL) of dichloromethane and hexane was added, and recrystallization was carried out to obtain compound (Q-1) (17.4 g). The yield was 86%.
Preparation Example for Compound (R-1)

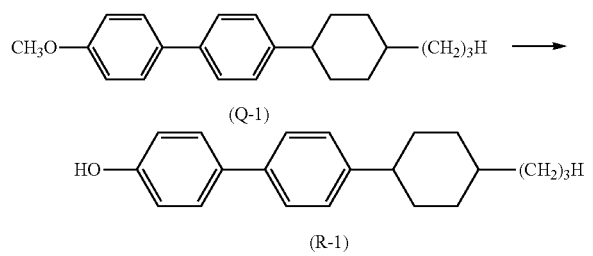

Into a 500 mL four-necked flask equipped with a reflux condenser, a stirrer and a dropping apparatus, compound (Q-1) (10 g, 0.032 mol) obtained in the above Preparation Example and dichloromethane (300 mL) were added. In a nitrogen stream, a 1 mol/L boron tribromide-dichlromethane solution (34 mL) was dropwise added over a period of 30 minutes. The dropwise adding operation was carried out under cooling with ice so that the internal temperature would not exceed 10° C. After stirring at room temperature for two hours, water and diethyl ether were added for liquid separation, and the organic layer was recovered. The recovered organic layer was washed with a saturated sodium carbonate aqueous solution and dried by an addition of anhydrous magnesium sulfate. By filtration under reduced pressure, anhydrous magnesium sulfate was removed, and the filtrate was concentrated to obtain powdery crystal. Recrystallization was carried out by using a solvent mixture (90 mL) of dichloromethane and hexane, to obtain compound (R-1) (8.93 g). The yield was 94%.
Preparation Example for Compound (2Bb1-1)

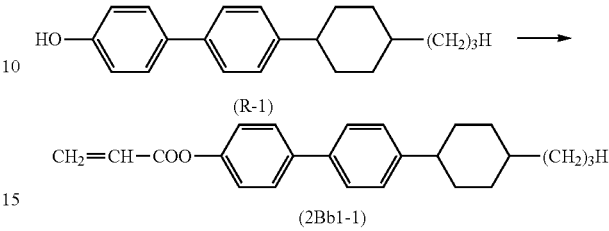

Into a 500 mL four-necked flask equipped with a reflux condenser, a stirrer and a dropping apparatus, compound (R-1) (8.0 g, 0.027 mol) obtained in the above Preparation Example, triethylamine (3.40 g, 0.033 mol) and tetrahydrofuran (300 mL) were added. In a nitrogen stream, acrylic acid chloride (2.94 g, 0.033 mol) was dropwise added under cooling with ice so that the internal temperature would not exceed 20° C. After stirring 24 hours, a mixture comprising concentrated hydrochloric acid (2 mL), ice (20 g) and water (30 mL) was added for liquid separation, and an organic layer was recovered. The recovered organic layer was washed with water, and then, the organic layer was dried over anhydrous magnesium sulfate. After filtrating off anhydrous magnesium sulfate, the solvent was distilled off to obtain compound (2Bb1-1) (8.1 g). The yield was 86%.

The phase transition temperature from the crystal phase to the nematic phase of compound (2Bb1-1) was 160° C., and the phase transition temperature from the nematic phase to the isotropic phase was 198° C. (extrapolation value). Further, Δn of compound (2Bb1-1) against a laser beam having a wavelength of 589 nm at 50° C. was 0.18 (extrapolation value).

The $^1$HNMR spectrum of compound (2Bb1-1) is shown below.

$^1$HNMR (400 MHz, solvent: CDCl$_3$, internal standard: TMS) δ (ppm): 0.91 (t, 3H), 1.09 (m, 2H), 1.1-1.4 (m, 5H), 1.50 (m, 2H), 1.91 (t, 4H), 2.51 (m, 1H), 5.9-6.7 (m, 3H), 7.0-7.3 (dd, 4H), 7.4-7.6 (dd, 4H)

(3) Preparation and Evaluation Example for Liquid Crystal Element (3-1) Preparation of Liquid Crystal Element Each liquid crystal composition obtained in (2) was injected into a cell obtained in (1) at 90° C. in the case of the composition using polymerizable liquid crystal 1 or 2. Photopolymerization was conducted under irradiation with ultraviolet light with an intensity of 45 mW/cm$^2$ at 66° C. so that the total amount of light became 8,100 mJ/cm$^2$ to obtain a liquid crystal element.

Further, the composition using polymerizable liquid crystal 3 was injected at 120° C., and photopolymerization was conducted under irradiation with ultraviolet light with an intensity of 45 mW/cm$^2$ at 120° C. so that the total amount of light became 8,100 mJ/cm$^2$ to obtain a liquid crystal element.

Further, the composition using polymerizable liquid crystal 4 was injected at 100° C., and photopolymerization was conducted under irradiation with ultraviolet light with an intensity of 45 mW/cm$^2$ at 50° C. so that the total amount of light became 8,100 mJ/cm$^2$ to obtain a liquid crystal element.

(3-2) Evaluation of Liquid Crystal Element

Each liquid crystal element obtained in (3-1) was irradiated with a Kr laser (multimode at wavelengths of 407 nm and 413 nm) by means of a Kr laser apparatus (tradename: Innova 302, manufactured by Coherent, Inc.) to carry out an accelerated exposure test with blue laser beam. The test temperature was 80° C., and the total energy was 30 Wh/mm² with respect to the liquid crystal elements using polymerizable liquid crystal 1 and polymerizable liquid crystal 2, 40 Wh/mm² with respect to the liquid crystal element using polymerizable liquid crystal 3, and 35 Wh/mm² with respect to the liquid crystal element using polymerizable liquid crystal 4.

In the respective Examples, the changes in transmittance between before and after the accelerated exposure test, are shown in Tables 1 to 4. Here, a case where the transmittance after the test became smaller than the transmittance before the test, is shown by a minus value.

TABLE 1

|  |  | Ex. 1 | Ex. 2 | Ex. 3 | Ex. 4 |
|---|---|---|---|---|---|
| Polymerizable liquid crystal |  | 1 | 1 | 1 | 1 |
| Polymerization initiator | IC754 | 0.5 | 0.5 | 0.5 | 0.5 |
| Polymerization inhibitor | 2NDP | 0.2 | 0.2 | — | — |
| Hindered phenol compound | Compound (B-1) | — | — | — | 0.2 |
|  | Compound (B-4) | — | — | — | — |
| Hindered amine compound | Compound (A2-3) | — | 0.3 | 0.3 | — |
|  | Compound (A3-1) | — | — | — | — |
| Δn of polymer liquid crystal composition |  | 0.0437 | 0.0420 | — | 0.0411 |
| Total energy in exposure test | (Wh/mm²) | 30 | 30 | — | 30 |
| Change in transmittance (%) |  | −0.8 | −1.3 | — | −0.8 |

TABLE 2

|  |  | Ex. 5 | Ex. 6 | Ex. 7 | Ex. 8 |
|---|---|---|---|---|---|
| Polymerizable liquid crystal |  | 1 | 1 | 2 | 2 |
| Polymerization initiator | IC754 | 0.5 | 0.5 | 0.5 | 0.5 |
| Polymerization inhibitor | 2NDP | — | — | — | — |
| Hindered phenol compound | Compound (B-1) | 0.2 | 0.2 | 0.2 | 0.2 |
|  | Compound (B-4) | — | — | — | — |
| Hindered amine compound | Compound (A2-3) | 0.3 | — | — | 0.3 |
|  | Compound (A3-1) | — | 0.3 | — | — |
| Δn of polymer liquid crystal composition |  | 0.0412 | 0.0400 | 0.0410 | 0.0405 |
| Total energy in exposure test | (Wh/mm²) | 30 | 30 | 30 | 30 |
| Change in transmittance (%) |  | 0.0 | −0.1 | −0.9 | 0.0 |

TABLE 3

|  |  | Ex. 9 | Ex. 10 | Ex. 11 | Ex. 12 |
|---|---|---|---|---|---|
| Polymerizable liquid crystal |  | 3 | 3 | 3 | 3 |
| Polymerization initiator | IC754 | 0.5 | 0.5 | 0.5 | 0.5 |
| Polymerization inhibitor | 2NDP | 1.5 | — | — | — |
| Hindered phenol compound | Compound (B-1) | — | — | — | — |
|  | Compound (B-4) | — | — | 1.5 | 1.5 |
| Hindered amine compound | Compound (A2-3) | — | 0.3 | — | 0.3 |
|  | Compound (A3-1) | — | — | — | — |
| Δn of polymer liquid crystal composition |  | 0.0387 | — | 0.0353 | 0.0360 |
| Total energy in exposure test | (Wh/mm²) | 40 | — | 40 | 40 |
| Change in transmittance (%) |  | −2.5 | — | −6.9 | 0.3 |

TABLE 4

|  |  | Ex. 13 | Ex. 14 | Ex. 15 | Ex. 16 |
|---|---|---|---|---|---|
| Polymerizable liquid crystal |  | 3 | 4 | 4 | 4 |
| Polymerization initiator | IC754 | 0.5 | 0.5 | 0.5 | 0.5 |
| Polymerization inhibitor | 2NDP | — | — | — | — |
| Hindered phenol compound | Compound (B-1) | — | — | 0.2 | 0.2 |
|  | Compound (B-4) | 1.5 | — | — | — |
| Hindered amine compound | Compound (A2-3) | - | 0.3 | — | 0.3 |
|  | Compound (A3-1) | 0.3 | — | — | — |

TABLE 4-continued

|  | | Ex. 13 | Ex. 14 | Ex. 15 | Ex. 16 |
|---|---|---|---|---|---|
| Δn of polymer liquid crystal composition | | 0.0357 | — | 0.1532 | 0.1531 |
| Total energy in exposure test | (Wh/mm$^2$) | 40 | — | 35 | 35 |
| Change in transmittance (%) | | −0.1 | — | −1.7 | 0.0 |

From these results, it has been found possible to suppress the change in transmittance between before and after the test, by using a hindered amine compound and a hindered phenol compound.

In Examples 3 and 14, no polymerization inhibitor was added, whereby non-uniformity in the injection of the polymerizable liquid crystal composition into the cell, resulted, and the in-plane distribution of the retardation value became remarkably large. Further, in Example 10, no polymerization inhibitor was added, whereby at the time of the injection into the cell, the polymerizable liquid crystal composition underwent thermal polymerization.

INDUSTRIAL APPLICABILITY

The liquid crystal optical modulation element of the present invention is capable of maintaining good optical modulation characteristics over a long period of time and is therefore useful as an optical modulation element to modulate a blue laser beam, and it can be utilized as a polarization conversion element, a light quantity-controlling element, an aberration-correcting element or a diffraction element and can be used for an optical head device or a projector.

The entire disclosure of Japanese Patent Application No. 2005-302812 filed on Oct. 18, 2005 including specification, claims and summary is incorporated herein by reference in its entirety.

What is claimed is:

1. A liquid crystal optical modulation element to modulate a laser beam having a wavelength of at most 500 nm, which comprises a layer of a polymer liquid crystal composition on one transparent substrate, wherein
the transparent substrate has an alignment film on the surface and the alignment film is in contact with the layer of the polymer liquid crystal composition, and
the polymer liquid crystal composition is a polymer liquid crystal containing a hindered amine compound and a hindered phenol compound.

2. The liquid crystal optical modulation element according to claim 1, wherein the polymer liquid crystal composition is one obtained by polymerizing a polymerizable liquid crystal composition comprising a polymerizable liquid crystal, a hindered amine compound and a hindered phenol compound.

3. The liquid crystal optical modulation element according to claim 2, wherein the content of the hindered amine compound is from 0.05 to 5 mass % based on the polymerizable liquid crystal.

4. The liquid crystal optical modulation element according to claim 2, wherein the content of the hindered phenol compound is from 0.05 to 10 mass % based on the polymerizable liquid crystal.

5. The liquid crystal optical modulation element according to claim 2, wherein the polymerizable liquid crystal contains at least one of the following compounds (2) and (3):

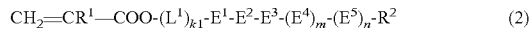

(2)

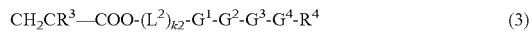

(3)

wherein each of R$^1$ and R$^3$ is a hydrogen atom or a methyl group; R$^2$ is a C$_{1-8}$ alkyl group; R$^4$ is a C$_{1-8}$ alkyl group or a fluorine atom; L$^1$ is —(CH$_2$)$_{p1}$O—, —(CH$_2$)$_{q1}$—, -Cy-COO—, -Cy-OCO—, -E$^6$-(CH$_2$)$_2$—, -E$^7$-CH$_2$O— or -E$^8$-O— (wherein Cy is a trans-1,4-cyclohexylene group, each of p1 and q1 which are independent of each other, is an integer of from 2 to 8); L$^2$ is —(CH$_2$)$_{p2}$O— or —(CH$_2$)$_{q2}$— (wherein each of p2 and q2 which are independent of each other, is an integer of from 2 to 8); each of E$^1$, E$^2$, E$^3$, E$^4$, E$^5$, E$^6$, E$^7$ and E$^8$ which are independent of one another, is a 1,4-phenylene group or a trans-1,4-cyclohexylene group (provided that at least one of E$^1$, E$^2$ and E$^3$ is a trans-1,4-cyclohexylene group, and in a case where L$^1$ is -Cy-OCO—, E$^1$ is a trans-1,4-cyclohexylene group); G$^1$ is a 1,4-phenylene group, each of G$^2$, G$^3$ and G$^4$ which are independent of one another is a 1,4-phenylene group or a trans-1,4-cyclohexylene group, and at least one of G$^2$ and G$^3$ is a trans-1,4-cyclohexylene group (provided that the 1,4-phenylene group and trans-1,4-cyclohexylene group in G$^1$ to G$^4$ may be such that a hydrogen atom bonded to a carbon atom in each group may be substituted by a fluorine atom, a chlorine atom or a methyl group); and each of k1, k2, m and n which are independent of one another, is 0 or 1, provided that when k1 is 1 and L$^1$ is -Cy-COO—, -Cy-OCO—, -E$^6$-(CH$_2$)$_2$—, -E$^7$-CH$_2$O— or -E$^8$-O—, at least one of m and n is 0.

6. The liquid crystal optical modulation element according to claim 1, which is capable of at least one of deflecting and diffracting a laser beam having a wavelength of from 300 to 450 nm.

7. An optical head device, comprising:
a light source for emitting a laser beam having a wavelength of at most 500 nm,
an objective lens for converging the laser beam emitted from the light source on an optical recording medium,
a photodetector for receiving the light converged and reflected on the optical recording medium, and
a liquid crystal optical modulation element to modulate a laser beam having a wavelength of at most 500 nm, comprising a layer of a polymer liquid crystal composition on one transparent substrate, wherein the transparent substrate has an alignment film on the surface which contacts the polymer liquid crystal composition, and the polymer liquid crystal composition is a polymer liquid crystal containing a hindered amine compound and a hindered phenol compound, disposed in an optical path between the light source and the optical recording medium or in an optical path between the optical recording medium and the photodetector.

8. The optical head device according to claim 7, wherein the polymer liquid crystal composition is one obtained by polymerizing a polymerizable liquid crystal composition comprising a polymerizable liquid crystal, a hindered amine compound and a hindered phenol compound.

9. The optical head device according to claim 8, wherein the content of the hindered amine compound is from 0.05 to 5 mass % based on the polymerizable liquid crystal.

10. The optical head device according to claim 8, wherein the content of the hindered phenol compound is from 0.05 to 10 mass % based on the polymerizable liquid crystal.

11. The optical head device according to claim 8, wherein the polymerizable liquid crystal contains at least one of the following compounds (2) and (3):

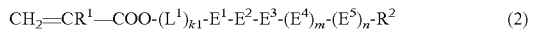  (2)

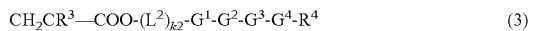  (3)

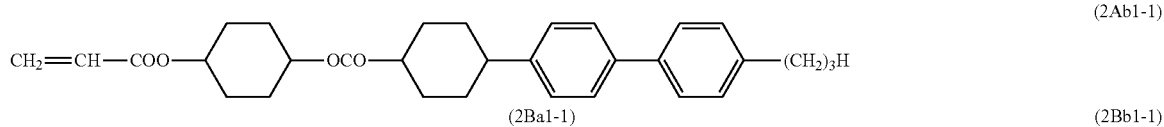

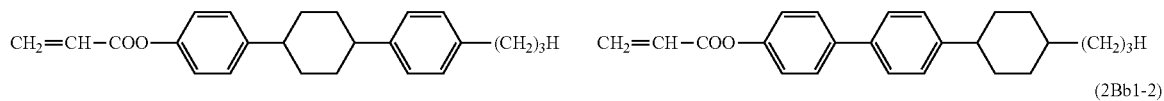

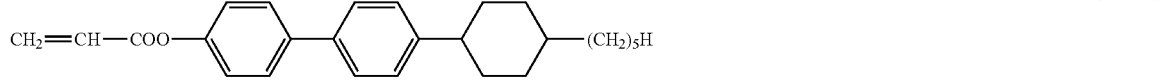

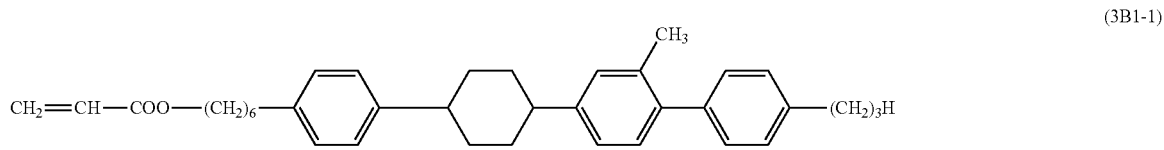

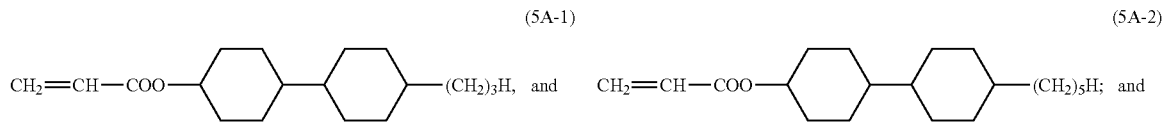

wherein each of $R^1$ and $R^3$ is a hydrogen atom or a methyl group; $R^2$ is a $C_{1-8}$ alkyl group; $R^4$ is a $C_{1-8}$ alkyl group or a fluorine atom; $L^1$ is —$(CH_2)_{p1}$O—, —$(CH_2)_{q1}$—, -Cy-COO—, -Cy-OCO—, -$E^6$-$(CH_2)_2$—, -$E^7$-$CH_2$O— or -$E^8$-O— (wherein Cy is a trans-1,4-cyclohexylene group, each of p1 and q1 which are independent of each other, is an integer of from 2 to 8); $L^2$ is —$(CH_2)_{p2}$O— or —$(CH_2)_{q2}$— (wherein each of p2 and q2 which are independent of each other, is an integer of from 2 to 8); each of $E^1$, $E^2$, $E^3$, $E^4$, $E^5$, $E^6$, $E^7$ and $E^8$ which are independent of one another, is a 1,4-phenylene group or a trans-1,4-cyclohexylene group (provided that at least one of $E^1$, $E^2$ and $E^3$ is a trans-1,4-cyclohexylene group, and in a case where $L^1$ is -Cy-OCO—, $E^1$ is a trans-1,4-cyclohexylene group); $G^1$ is a 1,4-phenylene group, each of $G^2$, $G^3$ and $G^4$ which are independent of one another is a 1,4-phenylene group or a trans-1,4-cyclohexylene group, and at least one of $G^2$ and $G^3$ is a trans-1,4-cyclohexylene group (provided that the 1,4-phenylene group and trans-1,4-cyclohexylene group in $G^1$ to $G^4$ may be such that a hydrogen atom bonded to a carbon atom in each group may be substituted by a fluorine atom, a chlorine atom or a methyl group); and each of k1, k2, m and n which are independent of one another, is 0 or 1, provided that when k1 is 1 and $L^1$ is -Cy-COO—, -Cy-OCO—, -$E^6$-$(CH_2)_2$—, -$E^7$-$CH_2$O— or -$E^8$-O—, at least one of m and n is 0.

12. The optical head device of claim 7, wherein the liquid crystal optical modulation element is capable of at least one of diffracting and deflecting a laser beam having a wavelength of from 300 to 450 nm.

13. The liquid crystal optical modulation element according to claim 2, wherein the polymer liquid crystal composition is obtained by polymerizing a polymerizable liquid crystal composition comprising a mixture of at least one compound selected from the group consisting of:

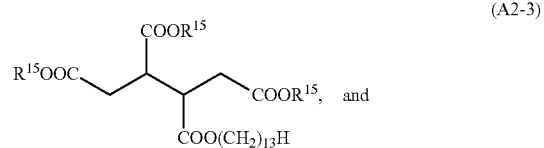

at least one hindered amine compound selected from the group consisting of:

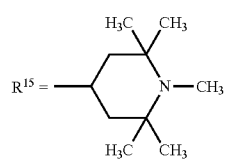

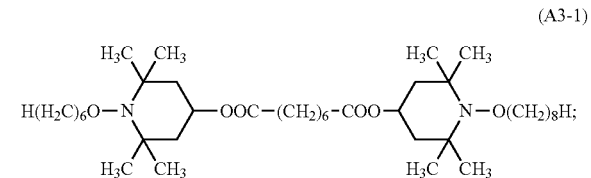

and at least one hindered phenol compound selected from the group consisting of:

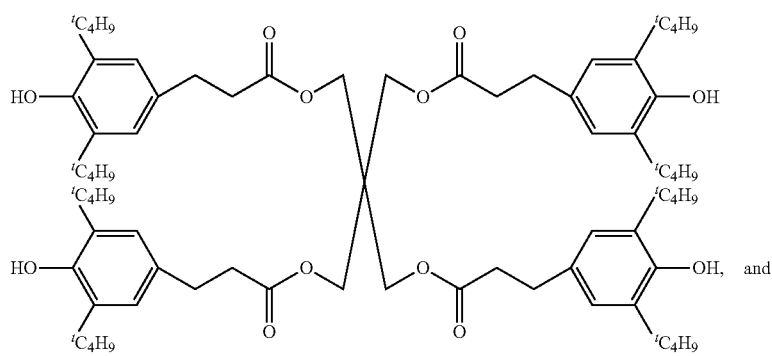
(2NDP)

(B-1)

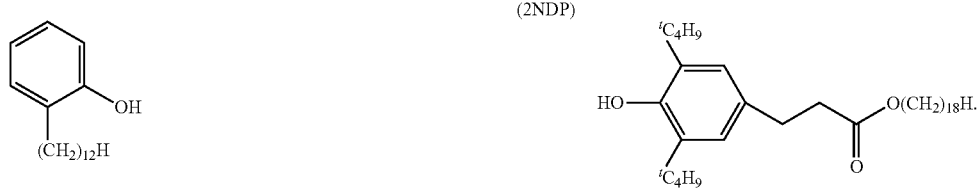

(B-4)

14. A liquid crystal optical modulation element according to claim 2, wherein the polymer liquid crystal composition is obtained by polymerizing a polymerizable liquid crystal composition comprising a mixture of at least one compound selected from the group consisting of

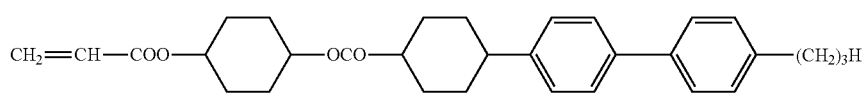
(2Ab1-1)

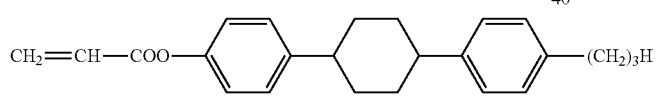
(2Ba1-1)

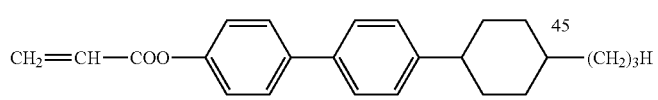
(2Bb1-1)

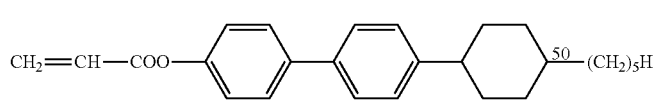
(2Bb1-2)

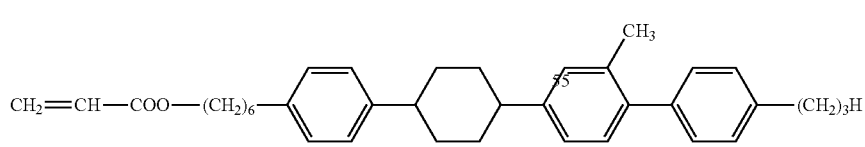
(3B1-1)

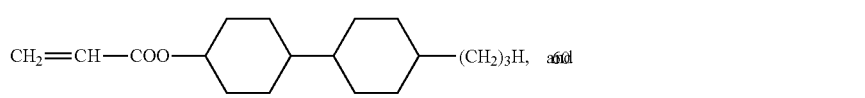
(5A-1)

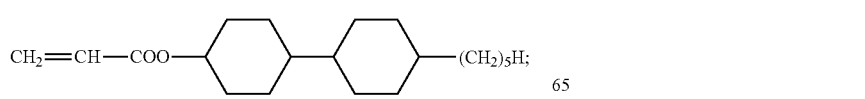
(5A-2)

at least one hindered amine compound selected from the group consisting of

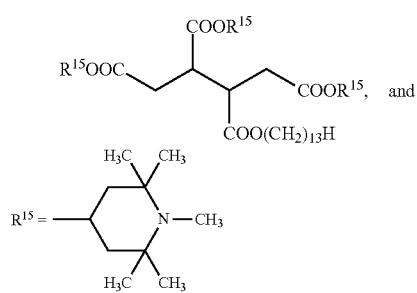
(A2-3)

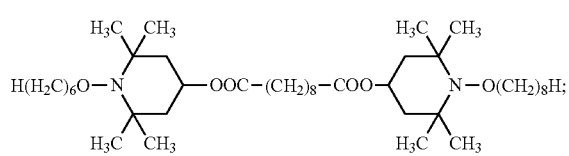
(A3-1)

and at least one hindered phenol compound selected from the group consisting of

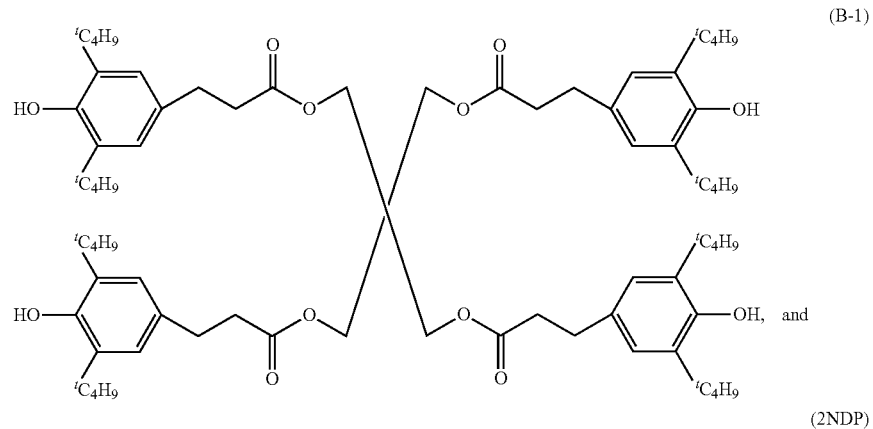
(B-1)

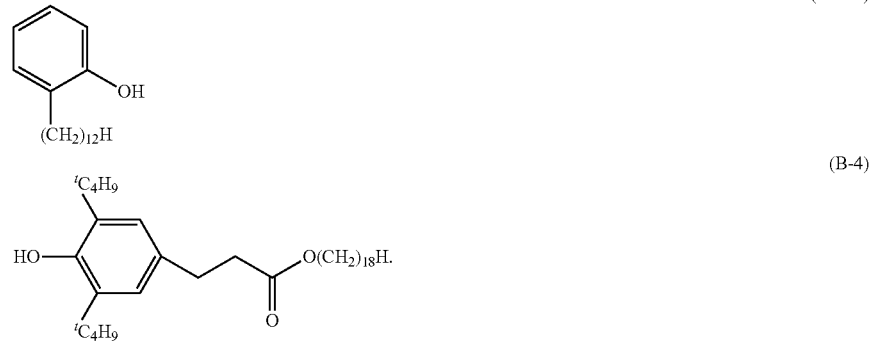
(2NDP)

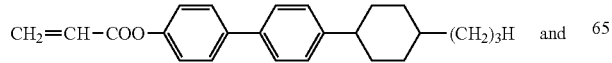
(B-4)

15. The liquid crystal optical modulation element according to claim 1, wherein the polymer liquid crystal composition is obtained by polymerizing a polymerizable liquid crystal composition comprising:

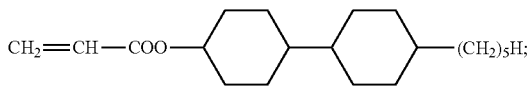
(2Bb1-1)

and

-continued

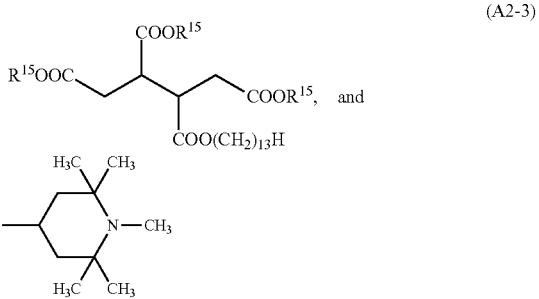
(5A-2)

at least one hindered amine compound selected from the group consisting of

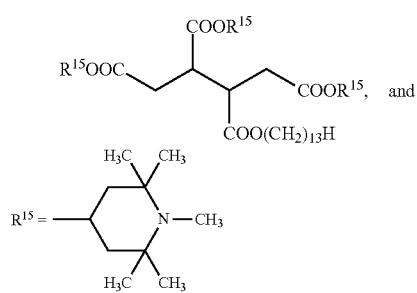
(A2-3)

-continued

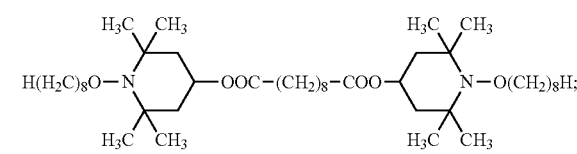
(A3-1)

and at least one hindered phenol compound selected from the group consisting of
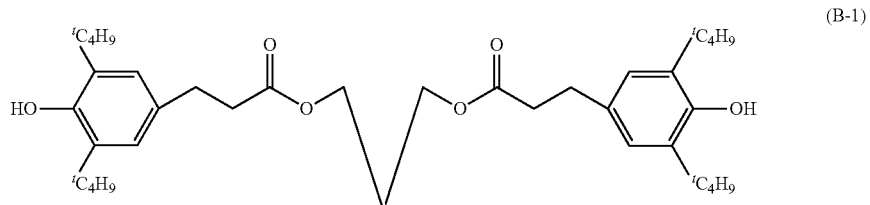
(B-1)
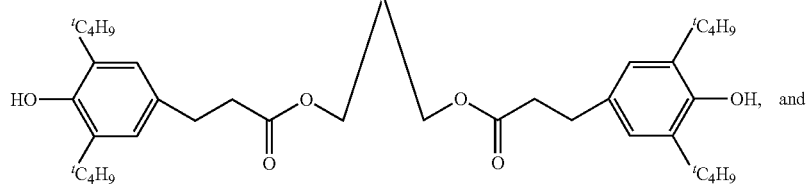
(2NDP)
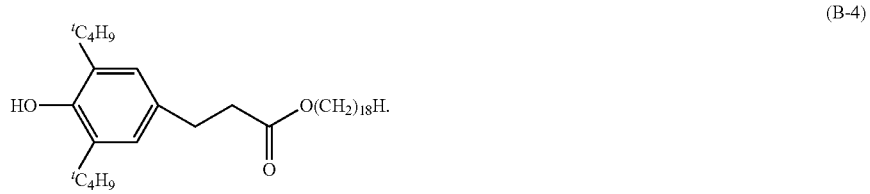
(B-4)
16. The optical head device according to claim 7, wherein the polymer liquid crystal composition is obtained by polymerizing a polymerizable liquid crystal composition comprising:
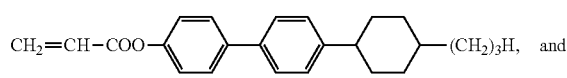
(2Bb1-1)
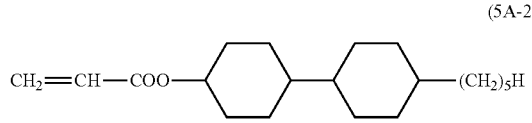
(5A-2)
at least one hindered amine compound selected from the group consisting of
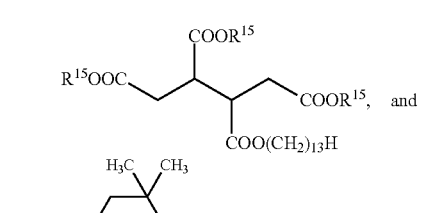
(A2-3)
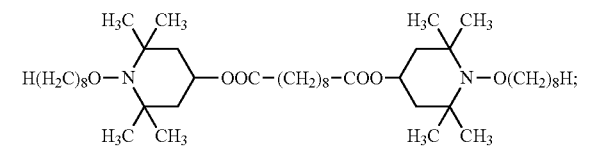
(A3-1)

and at least one hindered phenol compound selected from the group consisting of

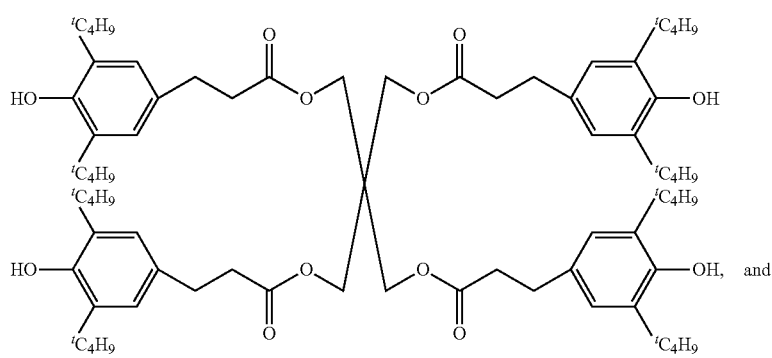
(B-1)

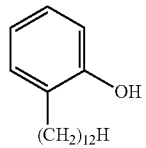
(2NDP)

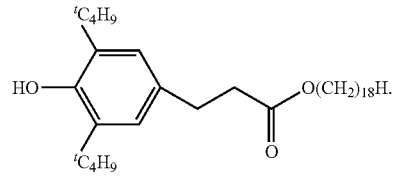
(B-4)

17. The liquid crystal optical modulation element according to claim 1, wherein the polymer liquid crystal composition is obtained by polymerizing a polymerizable liquid crystal composition comprising:

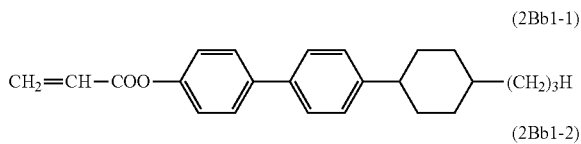
(2Bb1-1)

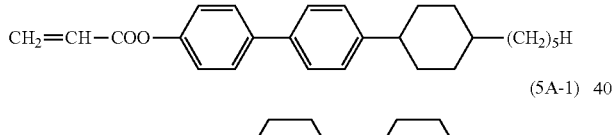
(2Bb1-2)

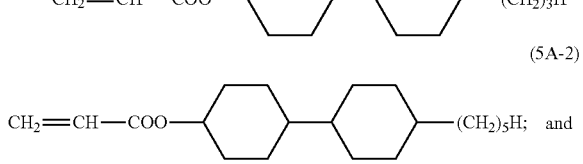
(5A-1)

(5A-2)

and the following hindered phenol compound:

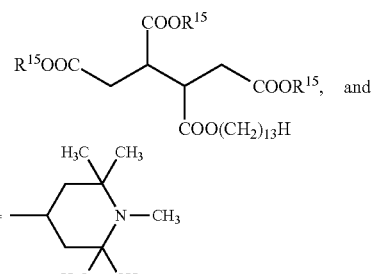
(A2-3)

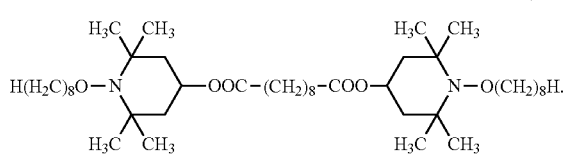
(A3-1)

at least one hindered amine compound selected from the group consisting of

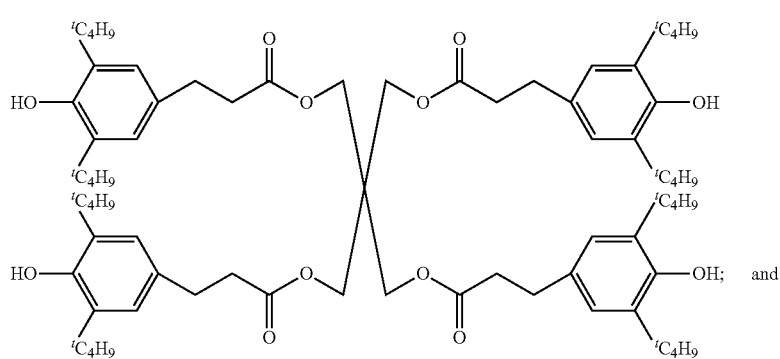
(B-1)

and

18. The optical head device according to claim 7, wherein the polymer liquid crystal composition is obtained by polymerizing a polymerizable liquid crystal composition comprising:

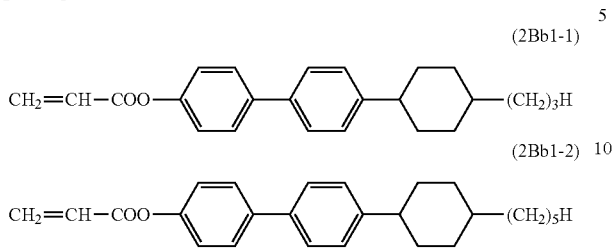

(2Bb1-1)

(2Bb1-2)

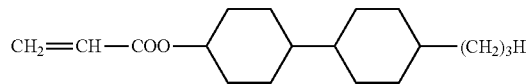

(5A-1)

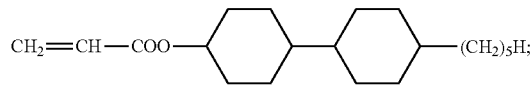

(5A-2)

the following hindered phenol compound

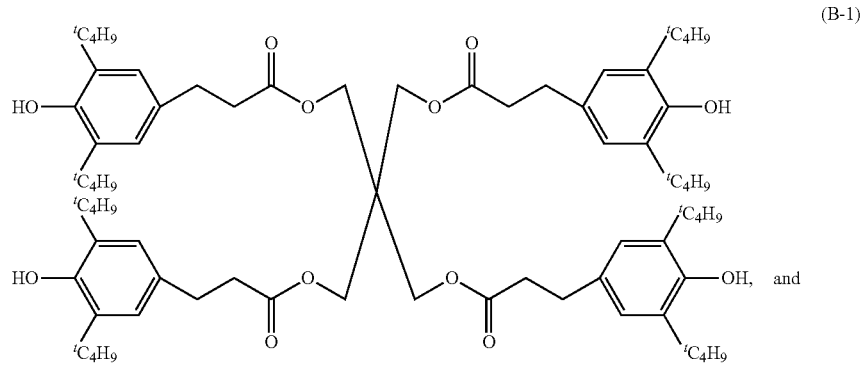

(B-1)

at least one hindered amine compound selected from the group consisting of:

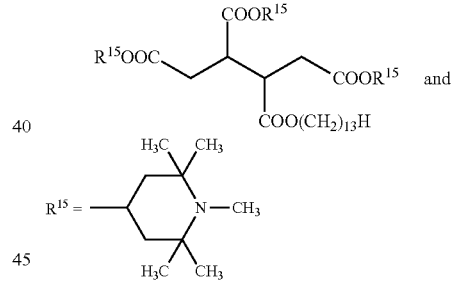

(A2-3)

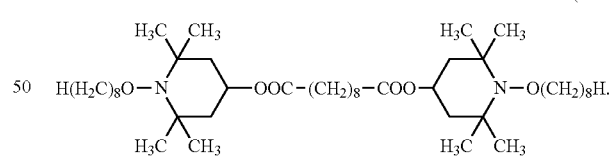

(A3-1)

19. The liquid crystal optical modulation element according to claim 1, wherein the polymer liquid crystal composition is obtained by polymerizing a polymerizable liquid crystal composition comprising:

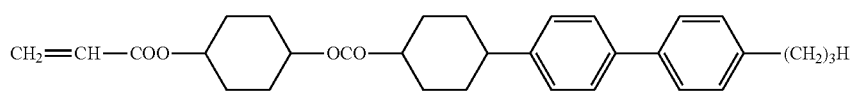

(2Ab1-1)

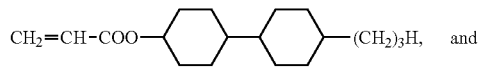

(5A-1)

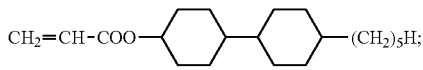

(5A-2)

the following hindered phenol compound:

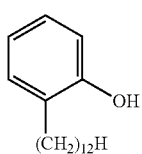
(2NDP)

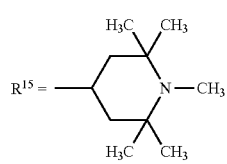
(B-4)

at least one hindered amine compound selected from the group consisting of

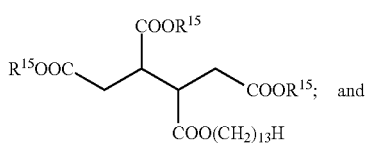
(A2-3)

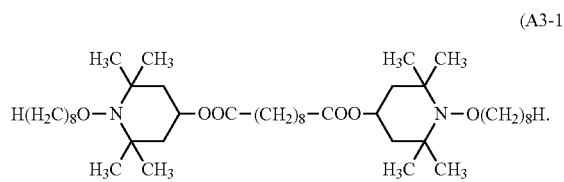
(A3-1)

20. The optical head device according to claim 7, wherein the polymer liquid crystal composition is obtained by polymerizing a polymerizable liquid crystal composition comprising:

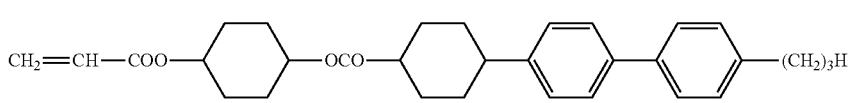
(2Ab1-1)

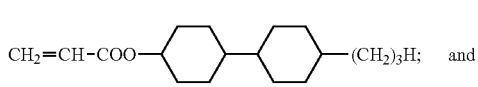
(5A-1)

the following hindered phenol compound:

(2NDP)

(B-4)

at least one hindered amine compound selected from the group consisting of (A2-3)

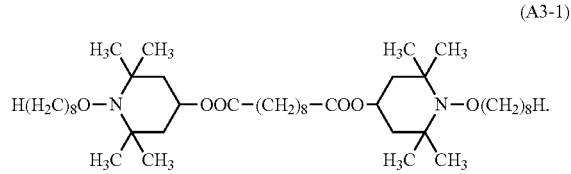
(A3-1)

21. The liquid crystal optical modulation element according to claim 1, wherein the polymer liquid crystal composition is obtained by polymerizing a polymerizable liquid crystal composition comprising:

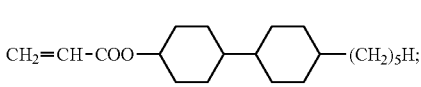
(5A-2)

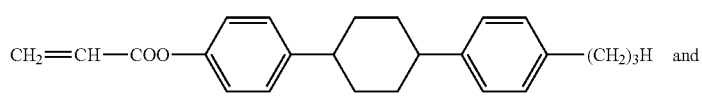
(2Ba1-1)
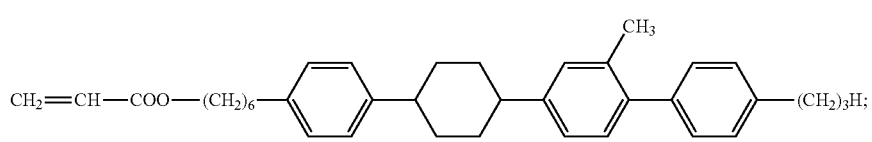
(3B1-1)
the following hindered phenol compound:
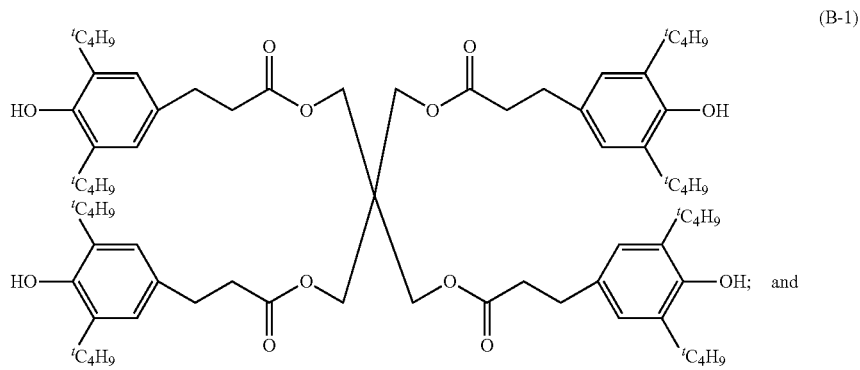
(B-1)
at least one hindered amine compound selected from the group consisting of
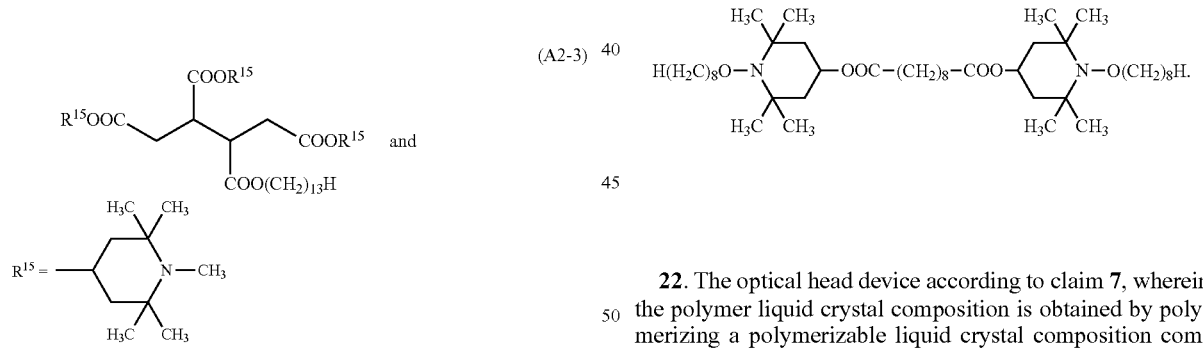
(A2-3)
(A3-1)
22. The optical head device according to claim 7, wherein the polymer liquid crystal composition is obtained by polymerizing a polymerizable liquid crystal composition comprising:
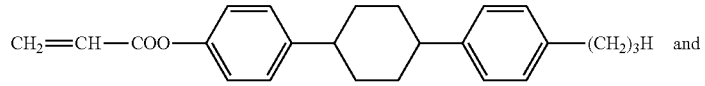
(2Ba1-1)
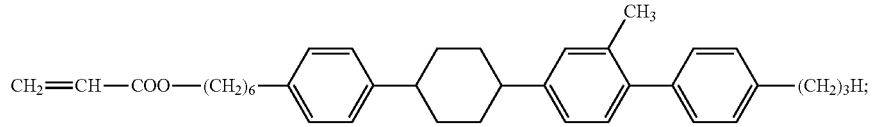
(3B1-1)

the following hindered phenol compound:
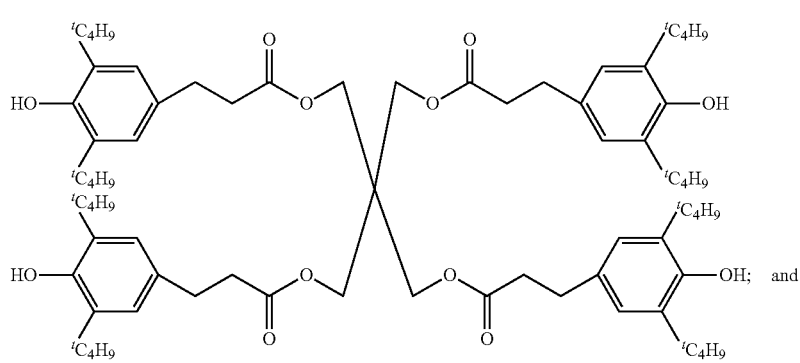
(B-1)
at least one hindered amine compound selected from the group consisting of:
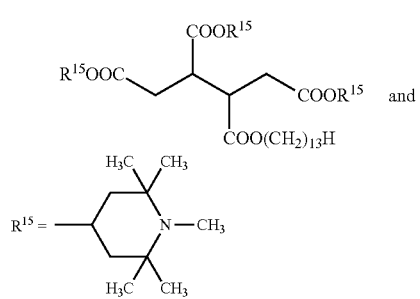
(A2-3)
-continued
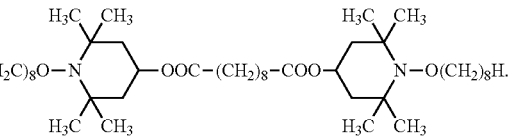
(A3-1)
* * * * *